US012768929B2

(12) United States Patent
Tsurumoto et al.

(10) Patent No.: US 12,768,929 B2
(45) Date of Patent: Oct. 20, 2026

(54) VEHICLE CONTROL DEVICE

(71) Applicant: HITACHI ASTEMO, LTD., Hitachinaka (JP)

(72) Inventors: Yuta Tsurumoto, Tokyo (JP); Keisuke Takeuchi, Tokyo (JP); Seiya Ishii, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 306 days.

(21) Appl. No.: 18/559,369

(22) PCT Filed: Mar. 8, 2022

(86) PCT No.: PCT/JP2022/009967
§ 371 (c)(1),
(2) Date: Nov. 7, 2023

(87) PCT Pub. No.: WO2023/276286
PCT Pub. Date: Jan. 5, 2023

(65) Prior Publication Data

US 2024/0241209 A1 Jul. 18, 2024

(30) Foreign Application Priority Data

Jun. 29, 2021 (JP) ................................ 2021-107413

(51) Int. Cl.
*G01S 5/02* (2010.01)

(52) U.S. Cl.
CPC .................................... *G01S 5/021* (2013.01)

(58) Field of Classification Search
CPC .. G01S 5/021; G01S 13/931; G01S 2013/932; G01S 7/40; G01C 21/28
(Continued)

(56) References Cited

U.S. PATENT DOCUMENTS 7,151,479 B2 * 12/2006 Beez .................... H01Q 1/3233 342/174
9,864,064 B2 * 1/2018 Ishigami ................. G01S 19/42
(Continued)

FOREIGN PATENT DOCUMENTS

JP 2010-060311 A 3/2010
JP 2018-182661 A 11/2018
(Continued)

OTHER PUBLICATIONS

International Search Report with English Translation and Written Opinion of International Patent Application No. PCT/JP2022/009967 dated May 31, 2022 (9 pages).

*Primary Examiner* — Michael W Justice
(74) *Attorney, Agent, or Firm* — Foley & Lardner LLP

(57) ABSTRACT

A vehicle control device is provided which has enhanced robustness against a shielding object, further, which does not measure a received radio wave from a radio transmitter and which can continue, for example, automatic driving control by comparing two types of vehicle positions calculated using the radio transmitter installed outside a vehicle and a sensor mounted on the vehicle and detecting an error in order to reduce a detection error of the radio transmitter due to a failure in communication of the radio transmitter. Two types of vehicle positions calculated using the sensor mounted on the vehicle and the radio transmitter are compared, and it is determined that the radio transmitter is affected by a shielding object in a case where a temporal change of a vehicle position deviation and/or a behavior change of a vehicle position (first own vehicle position) based on the radio transmitter is detected.

10 Claims, 18 Drawing Sheets

(58) Field of Classification Search
USPC .......................... 342/451, 70; 701/1; 340/988
See application file for complete search history.

(56) References Cited

U.S. PATENT DOCUMENTS

| | | | | |
|---|---|---|---|---|
| 10,397,861 | B2 * | 8/2019 | Konishi | G08G 1/096716 |
| 12,365,570 | B2 * | 7/2025 | Ulbrich | B66F 9/063 |
| 2005/0116854 | A1 * | 6/2005 | Beez | H01Q 19/062 342/107 |
| 2015/0149073 | A1 * | 5/2015 | Ishigami | G01C 21/30 701/409 |
| 2018/0310242 | A1 * | 10/2018 | Konishi | G08G 1/164 |
| 2020/0033885 | A1 * | 1/2020 | Kim | B60W 30/165 |
| 2020/0322758 | A1 | 10/2020 | Kosugi | |
| 2024/0067510 | A1 * | 2/2024 | Ulbrich | B66F 9/063 |

FOREIGN PATENT DOCUMENTS

| | | | |
|---|---|---|---|
| JP | 2020-169899 | A | 10/2020 |
| JP | 2020-173177 | A | 10/2020 |

* cited by examiner

FIG. 8

| ERROR STATE ERRSTS | POSITION ESTIMATION METHOD |
|---|---|
| 0 | RADIO POSITION ESTIMATION |
| 1 | RADIO POSITION ESTIMATION |
| 2 | OWN VEHICLE POSITION ESTIMATION |

VEHICLE CONTROL DEVICE

TECHNICAL FIELD

The present invention relates to a vehicle control device in which a radio receiver is installed in a vehicle, and a position of the vehicle is estimated from at least one of distance information based on reception intensity of a received radio wave from a radio transmitter installed outside the vehicle or orientation information based on a phase difference.

BACKGROUND ART

A method is known in which a combination of received radio waves from two or more radio transmitters is acquired in advance, a position of a mobile object on which a radio receiver is mounted is measured on the basis of the combination, and whether or not there is influence of a shielding object on the received radio waves is determined on the basis of a change in reception strength (see PTL 1).

CITATION LIST

Patent Literature

PTL 1: JP 2020-173177 A

SUMMARY OF INVENTION

Technical Problem

However, not only signal intensity of a radio wave transmitted from a radio receiver decreases due to a shielding object on a communication path, but also a traveling direction of the radio wave changes by diffraction. As illustrated in FIG. 18, in a case where a position of a vehicle is measured on the basis of distance and orientation information of a radio transmitter received at a radio receiver mounted on the vehicle from the radio transmitter installed outside the vehicle, an apparent position of the radio transmitter (a position of the radio transmitter viewed from the vehicle) may change due to a shielding object. In other words, the position and orientation information of the radio transmitter may be erroneously detected. In addition, in PTL 1, it is necessary to measure a combination of received radio waves from two or more radio transmitters in advance, which is troublesome.

It is therefore an object of the present invention to provide a vehicle control device which has enhanced robustness against a shielding object, further, which does not measure a received radio wave from a radio transmitter in advance, and which can, for example, continue automatic driving control by comparing two types of vehicle positions calculated using the radio transmitter installed outside a vehicle and a sensor mounted on the vehicle and detecting an error in order to reduce a detection error of the radio transmitter due to a failure in communication of the radio transmitter.

Solution to Problem

In order to achieve the above object, the present invention includes: a radio position estimation unit which receives a radio wave from a radio transmitter installed at an arbitrary position outside a vehicle and calculates relative positions of the vehicle and the radio transmitter; an own vehicle position estimation unit which calculates a position of the vehicle on the basis of information acquired by a sensor mounted on the vehicle; and a vehicle sensor error determination unit which determines that the received radio wave is affected by a shielding object on the basis of comparison between a first own vehicle position acquired by the radio position estimation unit and a second own vehicle position acquired by the own vehicle position estimation unit.

Advantageous Effects of Invention

According to the present invention, when a failure such as a slip or a step with respect to a sensor mounted on a vehicle and a shielding object or radio wave interference with respect to a radio transmitter occurs, by determining that a detection error has occurred and determining a sensor to be used, it is possible to enhance robustness against the failure in own vehicle position estimation using the radio transmitter. In addition, the above effect can be obtained by using a sensor provided as standard in the vehicle without incorporating an external recognition sensor such as a camera and a sonar in the configuration.

Problems, configurations, and effects other than those described above will be clarified by the following description of embodiments, and the like.

BRIEF DESCRIPTION OF DRAWINGS

FIG. 8 is a table indicating outline of position information selection according to the first embodiment of the present invention.

DESCRIPTION OF EMBODIMENTS

In the following embodiments, description will be divided into a plurality of sections or embodiments when necessary for the sake of convenience, but unless otherwise specified, the sections or embodiments are not unrelated to each other, and one is in a relationship of some or all modifications, details, supplementary explanation, and the like, of the other.

Hereinafter, embodiments of the present invention will be described in detail with reference to FIGS. 1 to 17.

First Embodiment

First, a first embodiment of the present invention will be described in detail with reference to FIGS. 1 to 14.

Figure 1:
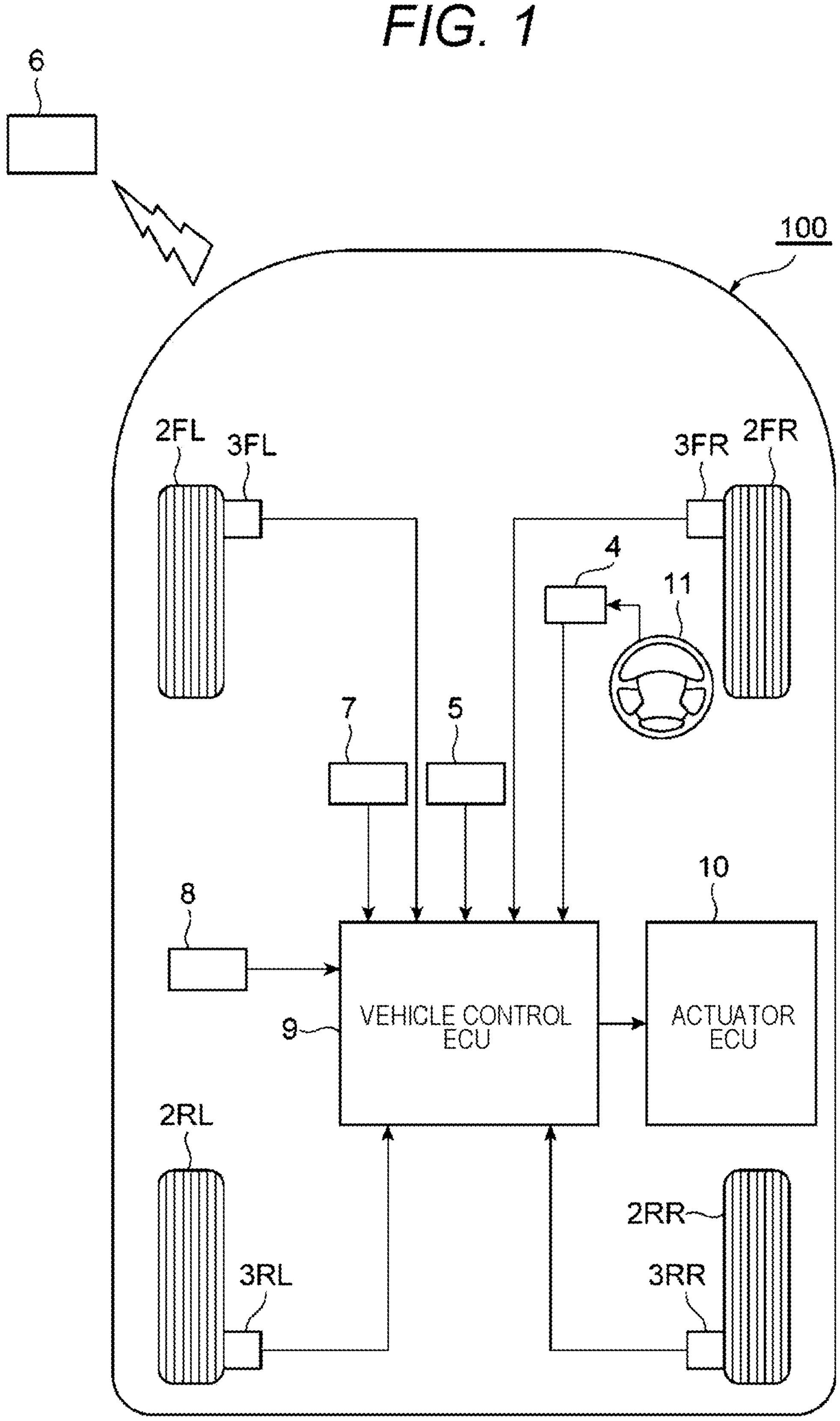
FIG. 1 is a view schematically illustrating an example of a configuration of a vehicle 100 equipped with a vehicle control ECU 9 as a vehicle control device according to a first embodiment of the present invention.

First, a configuration of a vehicle 100 equipped with a vehicle control electronic control unit (ECU) 9 as a vehicle control device according to the first embodiment of the present invention will be described with reference to FIG. 1. The vehicle control ECU 9 of the present embodiment is mounted on the vehicle (own vehicle) 100 and can execute automatic driving control of the vehicle 100.

The vehicle 100 mainly includes a right front wheel speed sensor 3FR that detects wheel speed of a right front wheel 2FR, a right rear wheel speed sensor 3RR that detects wheel speed of a right rear wheel 2RR, a left rear wheel speed sensor 3RL that detects wheel speed of a left rear wheel 2RL, a left front wheel speed sensor 3FL that detects wheel speed of a left front wheel 2FL, an electric power steering device 4 that changes a direction of each wheel 2 (2FR, 2RR, 2RL, 2FL) according to a steering angle of a steering wheel 11 provided in a driving room of the vehicle 100, a radio receiver 5 that acquires distance and orientation information of a radio transmitter 6 on the basis of a radio wave transmitted from the radio transmitter 6 installed at an arbitrary position outside the vehicle 100, an acceleration sensor 7, a global positioning system (GPS) 8, the vehicle control ECU 9, an actuator ECU 10, and the like. The distance information acquired by the radio receiver 5 can be acquired, for example, from reception strength (received signal strength indicator (RSSI)) using attenuation characteristics according to a propagation distance. Further, for example, the radio receiver 5 includes two or more antennas 12 (FIG. 2), and the orientation information can be acquired from a phase difference between the antennas.

Figure 2:
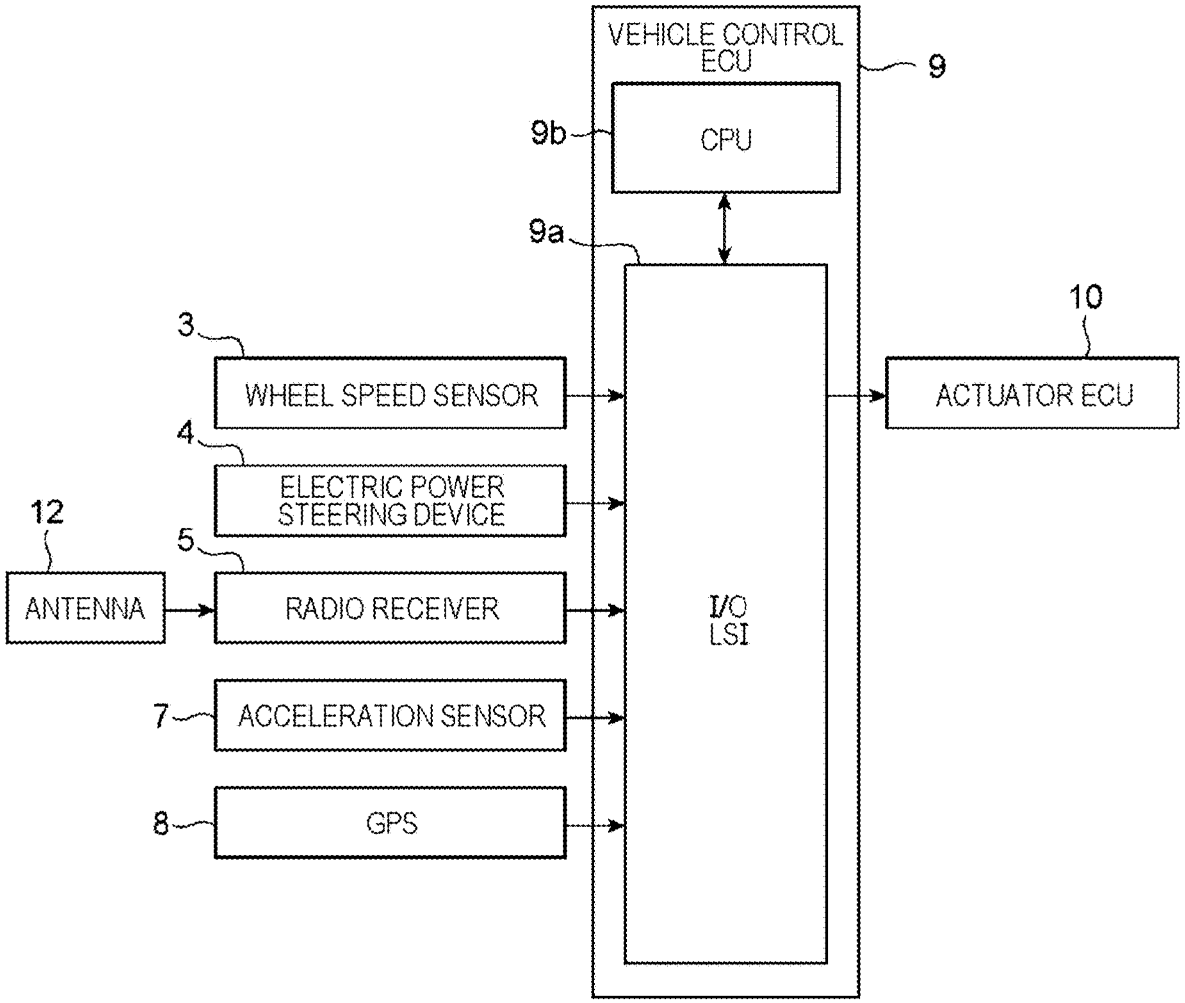
FIG. 2 schematically illustrates an example of an internal configuration of the vehicle control ECU 9 as the vehicle control device according to the first embodiment of the present invention and is a block diagram illustrating a relationship of input and output signals of the vehicle control ECU 9 illustrated in FIG. 1.

Next, an internal configuration of the vehicle control ECU 9 will be described with reference to FIG. 2. The vehicle control ECU 9 includes an I/O LSI 9*a* including an A/D converter, a CPU 9*b*, and the like. As described above, the vehicle control ECU 9 receives signals from a wheel speed sensor 3 (3FR, 3RR, 3RL, 3FL), the electric power steering device 4, the radio receiver 5, the acceleration sensor 7, and the GPS 8. Note that a communication method of these is not limited, and these may be directly connected via a car aria network (CAN). In addition, the radio receiver 5 and a plurality of antennas 12 are desirably provided in the same ECU so that time stamps of received radio waves between the antennas become the same. The vehicle control ECU 9 controls the own vehicle 100 by transmitting command values of various actuators to the actuator ECU 10 on the basis of a traveling state of the own vehicle 100 and a predetermined route.

Figure 3:
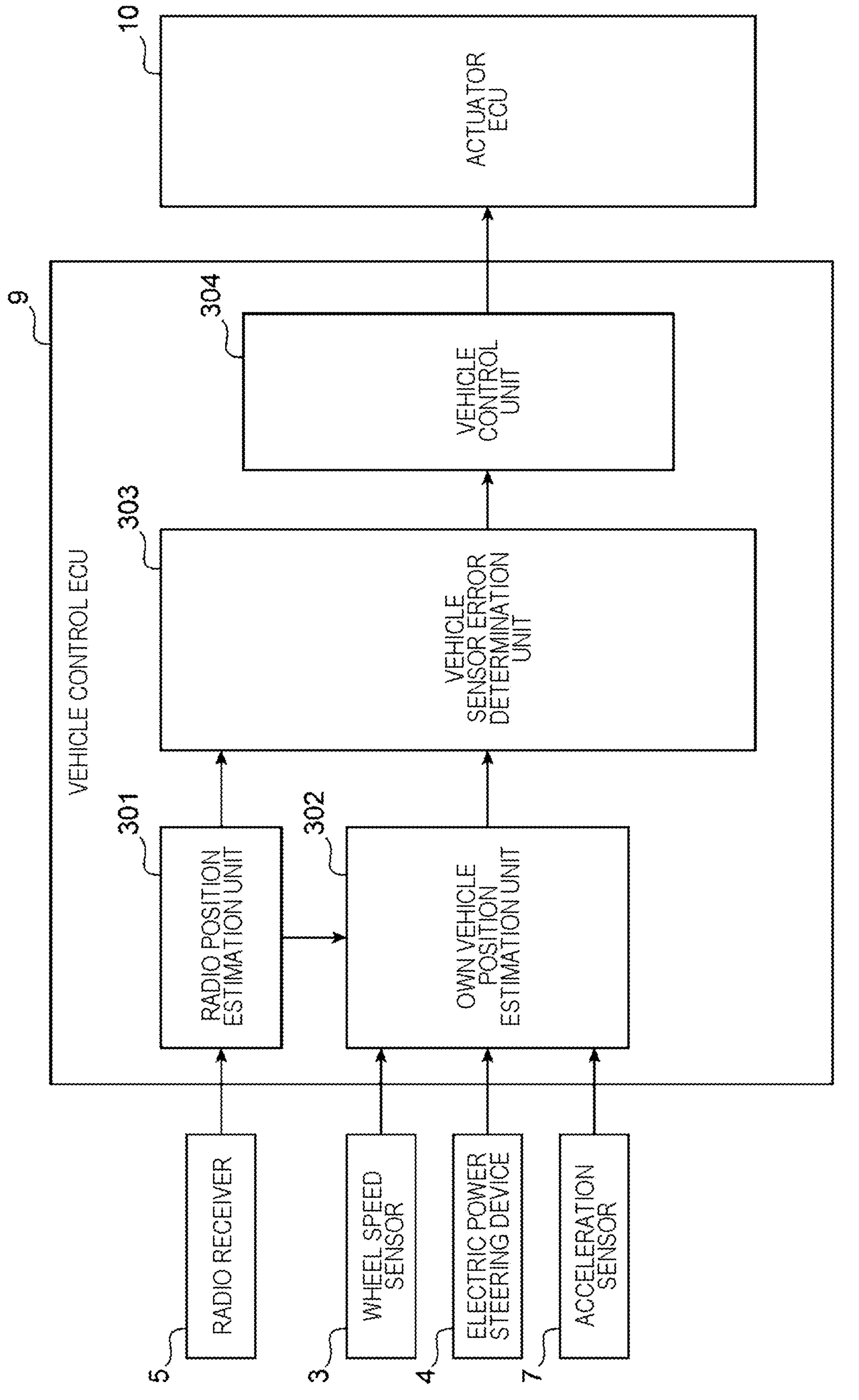
FIG. 3 is a functional block diagram of inside of the vehicle control ECU 9 according to the first embodiment of the present invention.

Specifically, as illustrated in FIG. 3, the vehicle control ECU 9 basically includes a radio position estimation unit 301, an own vehicle position estimation unit 302, a vehicle sensor error determination unit 303, and a vehicle control unit 304. The vehicle control ECU 9 is constituted as a computer including a processor such as a central processing unit (CPU), a memory such as a read only memory (ROM), a random access memory (RAM), and a hard disk drive (HDD), and the like. Each function of the vehicle control ECU 9 is implemented by the processor executing a program stored in the ROM. The RAM stores data including intermediate data of calculation by a program to be executed by the processor.

The radio position estimation unit 301 calculates a first own vehicle position, first speed, and a first traveling direction of the own vehicle 100 with a position of the radio transmitter 6 as an origin from distance and/or orientation information of the radio transmitter 6 acquired by the radio receiver 5. The radio position estimation unit 301 transmits the calculated first own vehicle position, first speed, and first traveling direction to the own vehicle position estimation unit 302 and the vehicle sensor error determination unit 303.

The own vehicle position estimation unit 302 acquires the wheel speed of each wheel 2 from the wheel speed sensor 3, acquires a steering angle of the steering wheel 11 from the steering angle sensor of the electric power steering device 4, acquires a yaw rate generated in the own vehicle 100 from the acceleration sensor 7, acquires a first own vehicle position from the radio position estimation unit 301 and calculates a second own vehicle position, second speed, and a second traveling direction of the own vehicle 100. The own vehicle position estimation unit 302 transmits the calculated second own vehicle position, second speed, and second traveling direction to the vehicle sensor error determination unit 303.

The vehicle sensor error determination unit 303 compares the first own vehicle position, the first speed, and the first traveling direction of the own vehicle 100 calculated by the radio position estimation unit 301 with the second own vehicle position, the second speed, and the second traveling direction of the own vehicle 100 calculated by the own vehicle position estimation unit 302, determines which of the wheel speed sensor 3 and/or the radio receiver 5 is affected by the error and determines the own vehicle position of the own vehicle 100 from the first own vehicle position and the second own vehicle position according to the determination result. The vehicle sensor error determination unit 303 transmits the own vehicle position, speed, and traveling direction of the own vehicle 100 to the vehicle control unit 304.

The vehicle control unit 304 calculates command values of various actuators so that the own vehicle 100 travels (autonomously travels) along a predetermined route on the basis of the own vehicle position, the speed, and the traveling direction of the own vehicle 100 calculated by the vehicle sensor error determination unit 303. The vehicle control unit 304 transmits the calculated command values of the various actuators to the actuator ECU 10.

In the actuator ECU 10, the own vehicle 100 can travel (autonomously travel) along the predetermined route by controlling the actuators on the basis of the command values of the various actuators calculated by the vehicle control unit 304.

Next, outline of the entire vehicle control by the vehicle control ECU 9 will be described using the flow of FIG. 4. Radio position estimation S401 in which the first own vehicle position of the own vehicle 100 is calculated on the basis of relative positions of the radio receiver 5 and the radio transmitter 6 is performed (radio position estimation unit 301), and own vehicle position estimation S402 in which the second own vehicle position of the own vehicle 100 is calculated on the basis of information or the like, acquired from the wheel speed sensor 3 with the own vehicle position of the own vehicle 100 in the radio position estimation S401 as an initial position is performed (own vehicle position estimation unit 302). The first own vehicle position and the second own vehicle position are compared in error state determination S403 to determine at least "no error is included", "an error due to a step or a slip is included in the wheel speed sensor 3", or "an error due to a shielding object or radio wave interference is included in the radio receiver 5" (vehicle sensor error determination unit 303), and which one of the first own vehicle position and the second own vehicle position is set as the own vehicle position of the own vehicle 100 is determined according to the determination result in position information selection S404 (vehicle sensor error determination unit 303). In actuator command value calculation S405, command values of various actuators are calculated so that the own vehicle position of the own vehicle 100 travels along the predetermined route (vehicle control unit 304). This is programmed in the vehicle control ECU 9 and repeatedly executed at a predetermined cycle.

Application of the present embodiment is not limited, and for example, in area-limited low-speed automatic driving, the radio transmitter 6 that can be identified with an ID is installed in an area, communication between the radio receiver 5 provided in the own vehicle 100 and the radio transmitter 6 is started, and the own vehicle 100 is guided along the predetermined route on the basis of the radio transmitter 6. In a situation where a communication path between the radio receiver 5 and the radio transmitter 6 is shielded by another vehicle or a pillar (shielding object), which is a situation that radio position estimation is not good at, or in a situation where an error is added to the wheel speed sensor 3 due to a road surface state such as a step or low friction, which is a situation that own vehicle position estimation is not good at, when the own vehicle 100 is guided, it is possible to identify a detection error by comparing information acquired by the radio receiver 5 mounted on the vehicle 100 with information acquired by the wheel speed sensor 3 and/or the electric power steering device 4.

<Radio Position Estimation S401 (Radio Position Estimation Unit 301)>

Next, details of the radio position estimation S401 of FIG. 4 will be described with reference to FIG. 5.

In S501, the distance and orientation information of the radio transmitter 6 based on reception strength and a phase difference acquired by the radio receiver 5 is acquired. Note that, in a case where the distance and orientation information cannot be acquired, processing for addressing a case where the radio transmitter 6 cannot be detected, such as not executing the processing in S502 and subsequent processing, may be performed.

In S502, the first own vehicle position (Xt, Yt) of the own vehicle 100 with the position of the radio transmitter 6 as the origin is calculated from the distance and orientation information of the radio transmitter 6. Note that a method for detecting the first own vehicle position (Xt, Yt) is not limited thereto. For example, two or more radio receivers 5 may be provided at predetermined positions, and the first own vehicle position may be calculated by triangulation on the basis of the orientation information acquired by the radio receivers 5.

In S503, a first yaw angle Yawt of the own vehicle 100 is calculated from the moving direction of the first own vehicle position (Xt, Yt). Note that a method for detecting the first yaw angle Yawt is not limited thereto. For example, two identifiable radio transmitters 6 may be provided in a predetermined direction, and the first yaw angle may be calculated from relative positions of the radio receiver 5 and the two radio transmitters 6.

In S504, first speed (vehicle speed) Vt of the own vehicle 100 is calculated from a temporal change amount of a moving distance of the first own vehicle position (Xt, Yt).

<Own Vehicle Position Estimation S402 (Own Vehicle Position Estimation Unit 302)>

Figure 6:
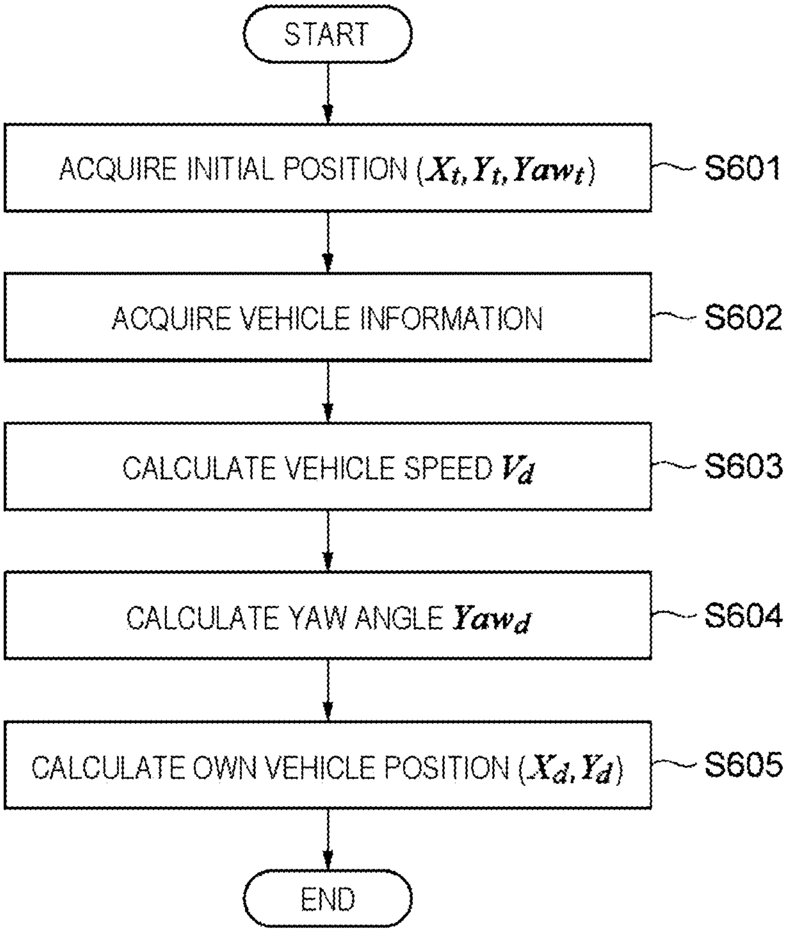
FIG. 6 is a flowchart indicating outline of own vehicle position estimation according to the first embodiment of the present invention.

Next, details of the own vehicle position estimation S402 in FIG. 4 will be described with reference to FIG. 6.

Figure 4:
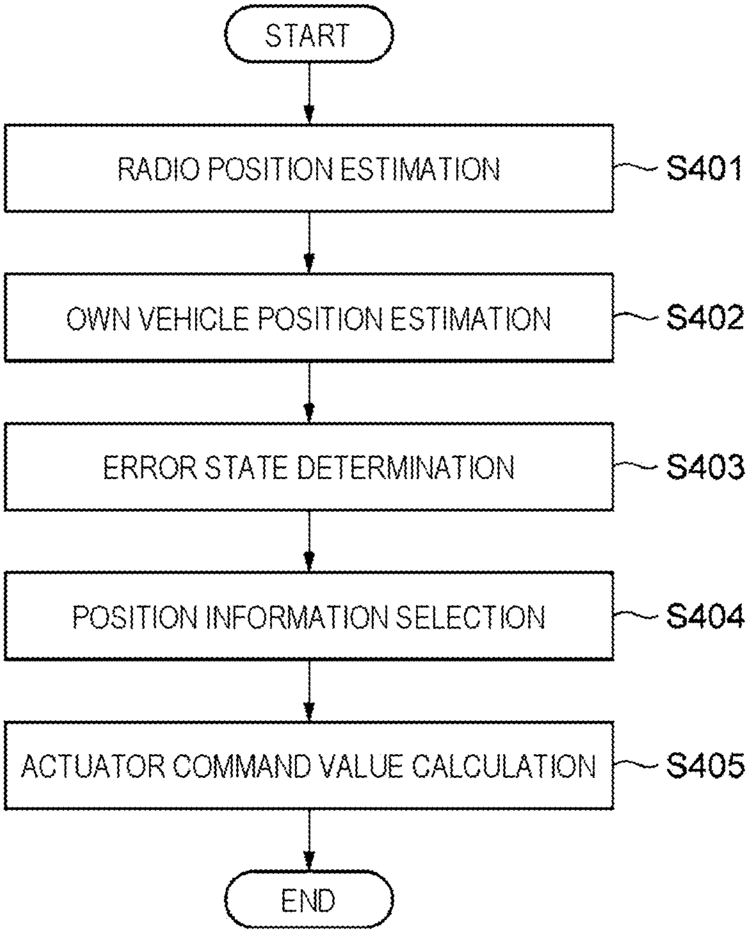
FIG. 4 is a flowchart indicating overall outline of vehicle control processing by the vehicle control ECU 9 according to the first embodiment of the present invention.
Figure 5:
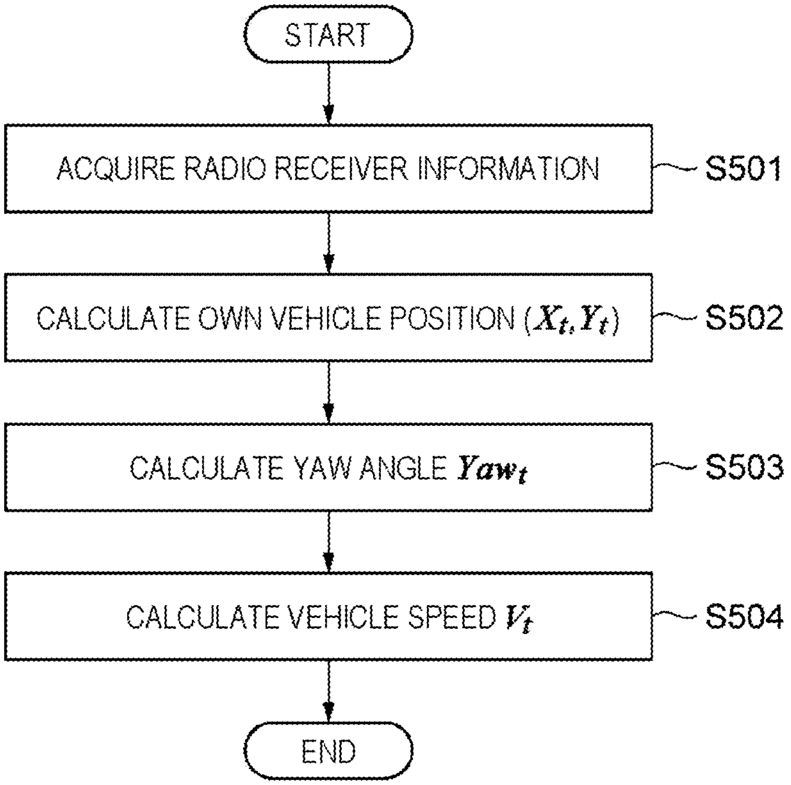
FIG. 5 is a flowchart schematically indicating radio position estimation according to the first embodiment of the present invention.

In S601, the first own vehicle position (Xt, Yt) and the first yaw angle Yawt in FIG. 5 are acquired and set as an initial position of the second own vehicle position. Note that the processing in S601 is not executed every cycle and is executed only the first time when the first own vehicle position and the first yaw angle are acquired, or in a case where it is determined that the wheel speed sensor 3 includes an error in S403 in FIG. 4, the processing is executed to perform correction by initialization.

In S602, the wheel speed of each wheel 2 is acquired from the wheel speed sensor 3, the steering angle of the steering wheel 11 is acquired from the steering angle sensor of the electric power steering device 4, and a yaw rate generated in the own vehicle 100 is acquired from the acceleration sensor 7.

In S603, second speed (vehicle speed) Vd of the own vehicle 100 is calculated from the wheel speed.

In S604, a second yaw angle Yawd of the own vehicle 100 is calculated from the steering angle and/or the yaw rate. In the present embodiment, the second yaw angle Yawd is a sum of products of the steering angles based on the steering angle sensor, the gyro sensor, or the acceleration sensor 7, and (the wheel speed of) the wheel speed sensor 3 that is greatly affected by the slip and/or the step is not used.

In S605, the moving distance is calculated from the wheel speed, and the second own vehicle position (Xd, Yd) of the own vehicle 100 is calculated from the initial position acquired in S601 and the second yaw angle acquired in S604.

<Error State Determination S403 (Vehicle Sensor Error Determination Unit 303)>

Next, details of the error state determination S403 in FIG. 4 will be described with reference to FIG. 7.

In S701, in order to determine whether an error is included in at least one of the wheel speed sensor 3 or the radio receiver 5, it is determined whether at least one of the deviations $|Xt-Xd|$ or $|Yt-Yd|$ of the respective element components of the first own vehicle position (Xt, Yt) and the second own vehicle position (Xd, Yd) exceeds a predetermined threshold. Here, if the deviation of the own vehicle position is equal to or less than the predetermined threshold, it is determined that the error is not included in the wheel speed sensor 3 and the radio receiver 5, and S703 is executed, and if the deviation of the own vehicle position exceeds the predetermined threshold, it is determined that the error is included in at least one of the wheel speed sensor 3 or the radio receiver 5, and S702 is executed. Further, in a case where the radio transmitter 6 is lost due to a failure, S705 may be unconditionally executed. In order to prevent erroneous determination, the determination in S701 may be made by continuously satisfying the condition for a predetermined determination period or a predetermined determination distance.

In S702, in order to determine which of the wheel speed sensor 3 and the radio receiver 5 includes an error, it is determined whether at least one of temporal changes $\Delta|Xt-Xd|$ or $\Delta|Yt-Yd|$ of the deviation of the respective element components of the first own vehicle position (Xt, Yt) and the second own vehicle position (Xd, Yd) exceeds a predetermined threshold. Here, if the temporal change of the deviation of the own vehicle position is equal to or less than the predetermined threshold, it is determined that the temporal change is temporary influence due to a step, a slip, or the like, and S704 is executed. If the temporal change of the deviation of the own vehicle position exceeds the predetermined threshold, it is determined that the temporal change is influence due to the own vehicle 100 entering a shadow of a shielding object as viewed from the radio transmitter 6, and S705 is executed. In order to prevent erroneous determination, the determination in S702 may be made by continuously satisfying the condition for a predetermined determination period or a predetermined determination distance.

In S703, an error state ERRSTS is set to 0 indicating that there is no error.

In S704, the error state ERRSTS is set to 1 indicating that there is an error in the wheel speed sensor 3 (in other words, the second own vehicle position).

In S705, the error state ERRSTS is set to 2 indicating that there is an error in the radio receiver 5 (in other words, the first own vehicle position).

<Position Information Selection S404 (Vehicle Sensor Error Determination Unit 303)>

In the position information selection S404 in FIG. 4, as illustrated in FIG. 8, either the first own vehicle position or the second own vehicle position corresponding to the value of the error state ERRSTS is determined as the own vehicle position of the own vehicle 100. In other words, if the error state ERRSTS is 0 or 1, the first own vehicle position (own vehicle position based on the radio position estimation S401) is determined as the own vehicle position of the own vehicle 100, and if the error state ERRSTS is 2, the second own vehicle position (own vehicle position based on the own vehicle position estimation S402) is determined as the own vehicle position of the own vehicle 100. In a case where the own vehicle 100 includes two or more radio receivers 5, the own vehicle position of the own vehicle 100 may be calculated from the distance and orientation information of the radio transmitter 6 acquired by the normally operating radio receiver 5 without using the distance and orientation information of the radio transmitter 6 acquired by the radio receiver 5 in a recognition failure.

Figure 9:
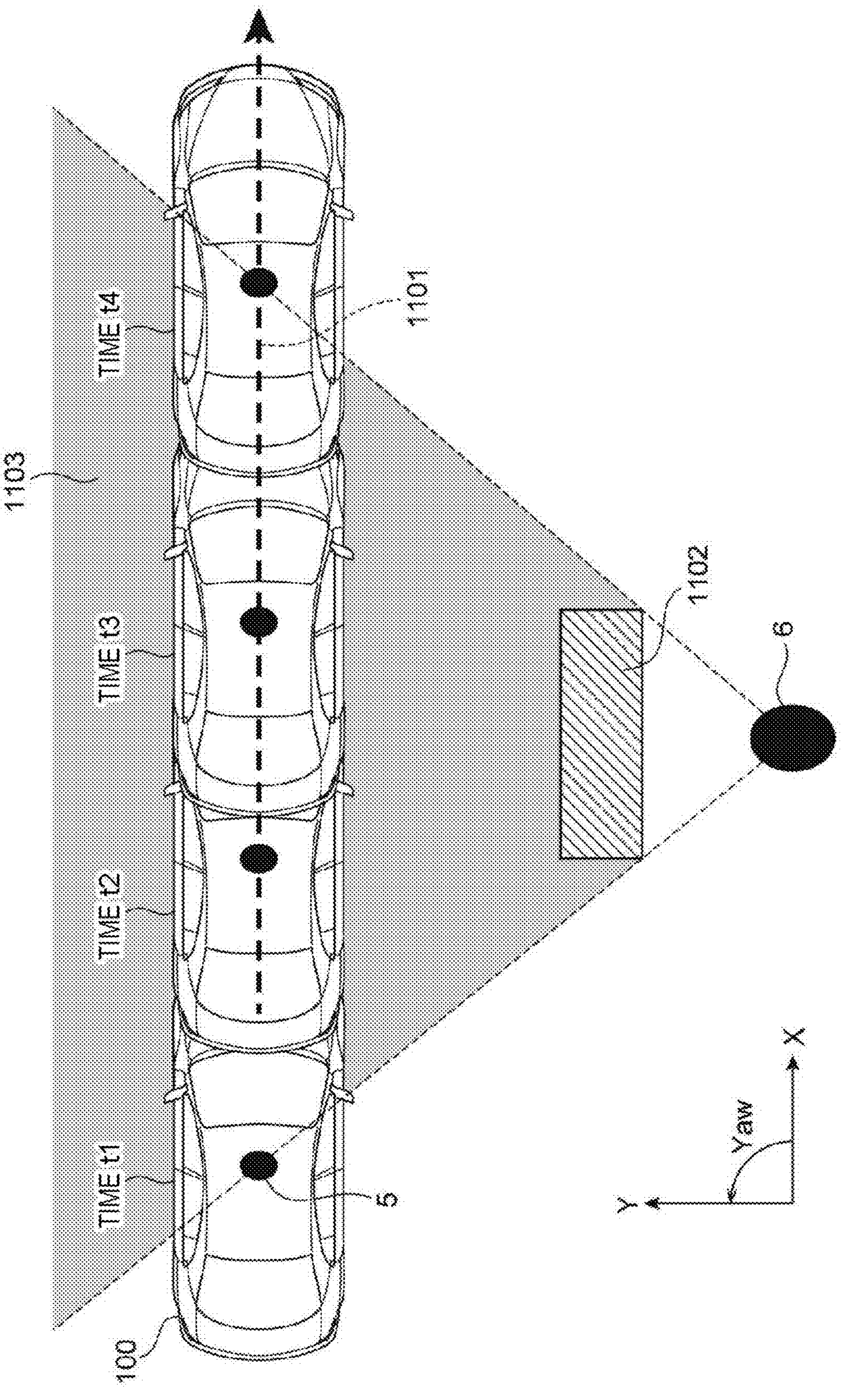
FIG. 9 is a bird's eye view schematically illustrating a scene in which an own vehicle 100 that performs radio position estimation on the basis of distance and orientation information of a radio transmitter 6 acquired by a radio receiver 5 according to an embodiment of the present invention enters a shadow of a shielding object.

FIG. 9 illustrates a scene in which the own vehicle 100 enters a shadow 1103 of a shielding object 1102 between the radio receiver 5 and the radio transmitter 6 while the own vehicle 100 according to the present embodiment is traveling on a predetermined route 1101 in a bird's eye view. A timing at which the radio receiver 5 enters the shadow 1103 is indicated at time t1, a timing at which the radio receiver 5 loses the radio transmitter 6 because the shadow 1103 is dark is indicated at time t2, a timing at which the radio receiver 5 re-receives a radio wave of the radio transmitter 6 because the shadow 1103 becomes light is indicated at time t3, and a timing at which the radio receiver 5 exits the shadow 1103 is indicated at time t4.

Figure 10:
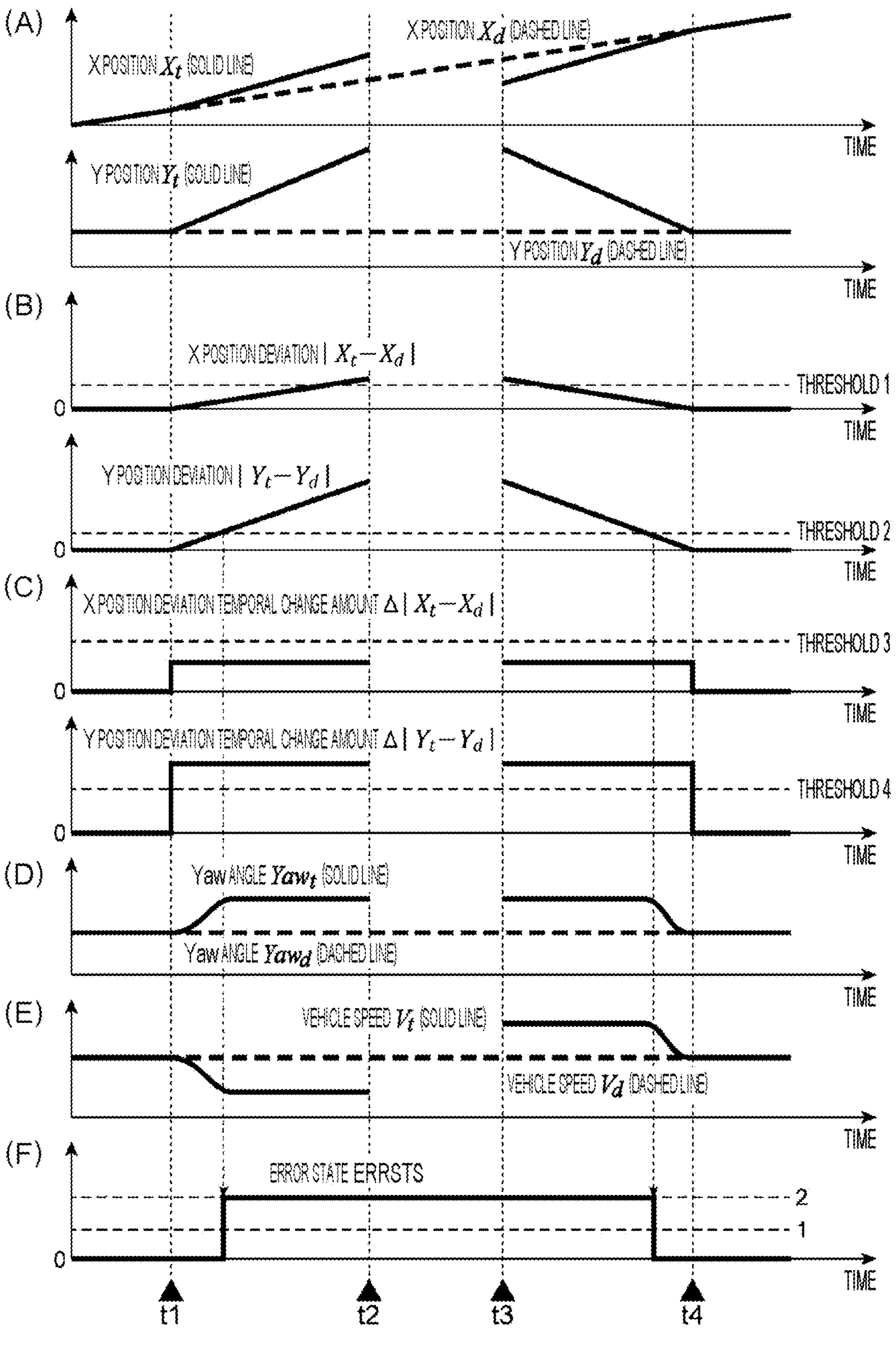
FIG. 10 is a time chart indicating own vehicle position information in a scene in which the own vehicle 100 that performs radio position estimation on the basis of the distance and orientation information of the radio transmitter 6 acquired by the radio receiver 5 according to an embodiment of the present invention enters a shadow of a shielding object.

Next, an example of processing from the radio position estimation S401 to the position information selection S404 in the scene of FIG. 9 will be described with reference to FIG. 10.

The radio receiver 5 not yet enters the shadow 1103 before time t1, and thus, the position deviations $|Xt-Xd|$ and $|Yt-Yd|$ are equal to or less than the predetermined threshold, the error state ERRSTS is 0, and the own vehicle position of the own vehicle 100 is calculated by the radio position estimation.

Between time t1 and time t2, the radio receiver 5 enters the shadow 1103, so that the position deviations $|Xt-Xd|$ and $|Yt-Yd|$ increase as the own vehicle 100 moves to the dark side of the shadow 1103, and a Y position deviation temporal change amount $\Delta|Yt-Yd|$ exceeds a predetermined threshold 4 at the timing when the position deviation $|Yt-Yd|$ exceeds a predetermined threshold 2, so that the error state ERRSTS becomes 2, and the own vehicle position of the own vehicle 100 is calculated by the own vehicle position estimation.

The radio receiver 5 has lost the radio transmitter 6 between time t2 and time t3, and thus, the error state ERRSTS is maintained at 2, and the own vehicle position of the own vehicle 100 is calculated by the own vehicle position estimation.

After time t3, the position deviations $|Xt-Xd|$ and $|Yt-Yd|$ decrease as the radio receiver 5 moves to a lighter side of the shadow 1103, the error state ERRSTS becomes 0 at a timing when the position deviation $|Yt-Yd|$ becomes equal to or less than the predetermined threshold 2, and the own vehicle position of the own vehicle 100 is calculated by the radio position estimation.

Figure 11:
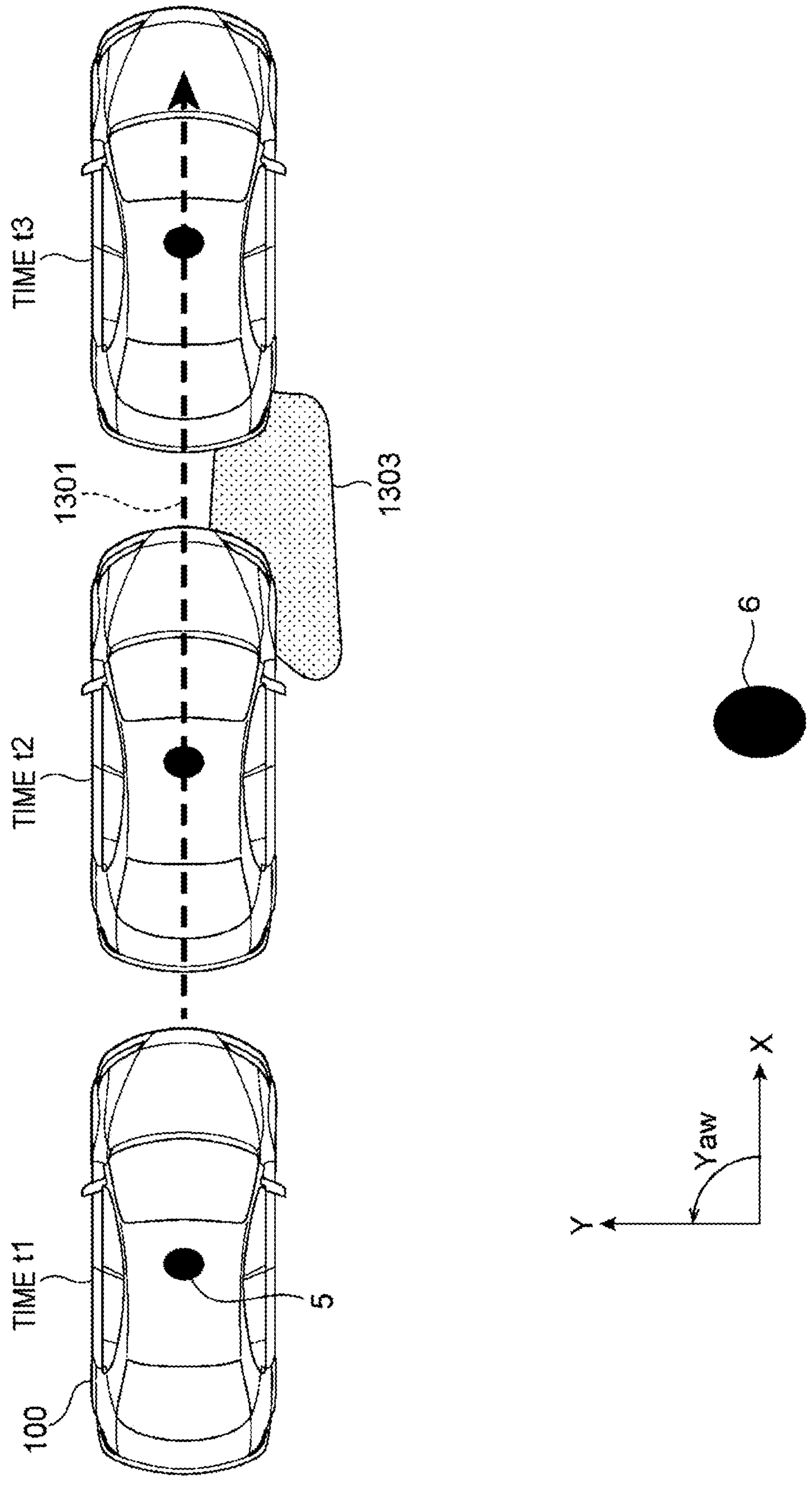
FIG. 11 is a bird's eye view schematically illustrating a scene in which the own vehicle 100 that performs radio position estimation on the basis of the distance and orientation information of the radio transmitter 6 acquired by the radio receiver 5 according to an embodiment of the present invention enters a muddy place and wheels slip.

FIG. 11 illustrates a scene in which the own vehicle 100 according to the present embodiment slips due to right front wheels 2FR and right rear wheels 2RR getting on a muddy place 1303 while traveling on a predetermined route 1301 in a bird's eye view. A timing at which the right front wheel 2FR gets on the muddy place 1303 is indicated at time t2, and a timing at which the initial position of the own vehicle position estimation is updated after a predetermined period has elapsed or after the vehicle has traveled by a predetermined distance is indicated at time t3.

Figure 12:
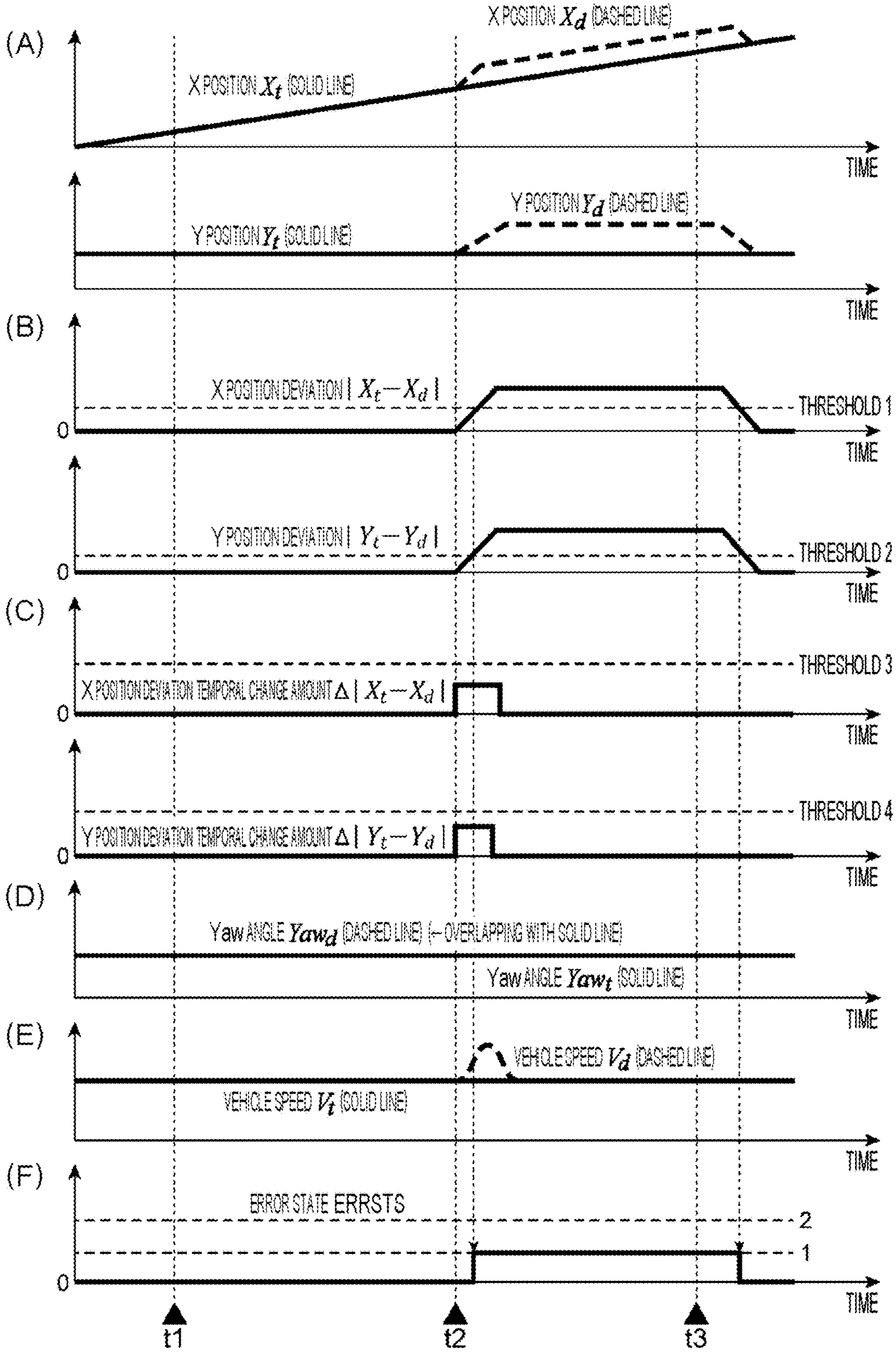
FIG. 12 is a time chart indicating own vehicle position information in a scene in which the own vehicle 100 that performs radio position estimation on the basis of the distance and orientation information of the radio transmitter 6 acquired by the radio receiver 5 according to an embodiment of the present invention enters a muddy place and wheels slip.

Next, an example of processing from the radio position estimation S401 to the position information selection S404 in the scene of FIG. 11 will be described with reference to FIG. 12.

The right front wheel 2FR not yet gets on the muddy place 1303 before time t2, and thus, the position deviations |Xt−Xd| and |Yt−Yd| are equal to or less than the predetermined threshold, the error state ERRSTS is 0, and the own vehicle position of the own vehicle 100 is calculated by the radio position estimation.

Between time t2 and time t3, the right front wheel 2FR slips due to the muddy place 1303, so that the position deviations |Xt−Xd| and |Yt−Yd| temporarily increase. At the timing when the position deviation |Xt−Xd| exceeds a predetermined threshold 1, an X position deviation temporal change amount Δ|Xt−Xd| and the Y position deviation temporal change amount Δ|Yt−Yd| are equal to or less than the predetermined threshold. Thus, the error state ERRSTS becomes 1, and the own vehicle position of the own vehicle 100 is calculated by the radio position estimation.

After time t3, by resetting the second own vehicle position to the first own vehicle position in S601 (FIG. 6) after a predetermined period has elapsed or the vehicle has traveled by a predetermined distance since the error state ERRSTS had become 1, the influence of slip is reduced. Note that when the second own vehicle position is corrected, the change amount of each element component may be limited to prevent the own vehicle 100 from performing sudden behavior.

Figure 13:
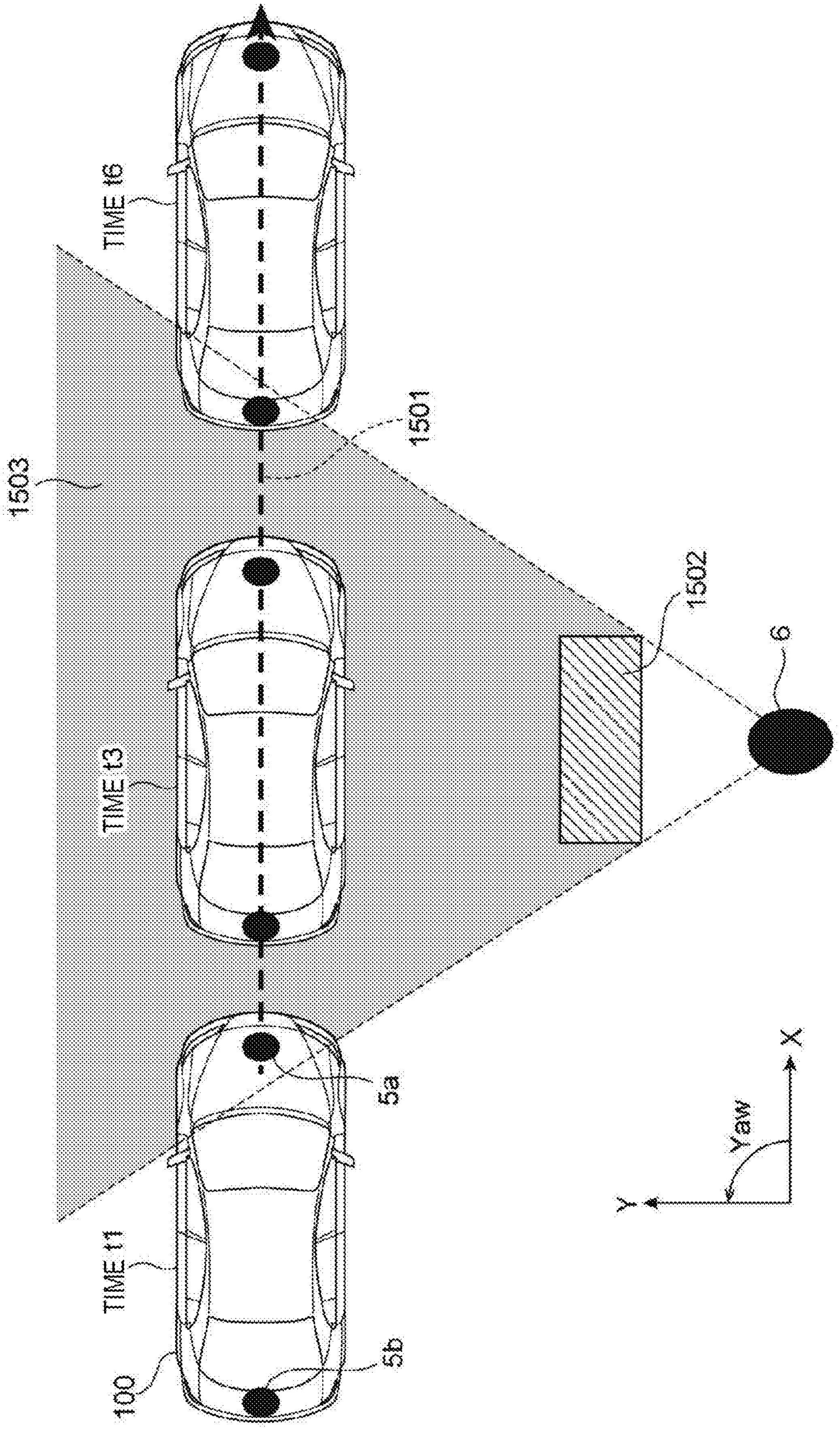
FIG. 13 is a bird's eye view schematically illustrating a scene in which the own vehicle 100 that performs radio position estimation by triangulation on the basis of the orientation information of the radio transmitter 6 acquired by the radio receiver 5 according to an embodiment of the present invention enters a shadow of a shielding object.

FIG. 13 illustrates a scene in which the own vehicle 100 according to the present embodiment enters a shadow 1503 of a shielding object 1502 between a radio receiver 5*a* provided on the front wheel side and a radio receiver 5*b* provided on the rear wheel side of the own vehicle 100 and the radio transmitter 6 while the own vehicle 100 is traveling along a predetermined route 1501 in a bird's eye view. In this scene, relative positions of the radio transmitter 6 and the own vehicle 100 are calculated by triangulation based on the orientation information of the radio transmitter 6 acquired by the radio receivers 5*a* and 5*b* and the known distance between the radio receivers 5*a* and 5*b*. A timing at which the radio receiver 5*a* enters the shadow 1503 is indicated at time t1, a timing at which the radio receiver 5*a* loses the radio transmitter 6 because the shadow 1503 is dark at the position of the radio receiver 5*a* (not illustrated in FIG. 13, illustrated in FIG. 14) is indicated at time t2, a timing at which the radio receiver 5*a* re-receives the radio wave of the radio transmitter 6 because the shadow 1503 becomes light is indicated at time t3, a timing at which the radio receiver 5*b* loses the radio transmitter 6 because the shadow 1503 is dark at the position of the radio receiver 5*b* (not illustrated in FIG. 13, illustrated in FIG. 14) is indicated at time t4, a timing at which the radio receiver 5*b* re-receives the radio wave of the radio transmitter 6 because the shadow 1503 becomes light (not illustrated in FIG. 13, illustrated in FIG. 14) is indicated at time t5, and a timing at which the radio receivers 5*a* and 5*b* exit the shadow 1503 is indicated at time t6.

Figure 14:
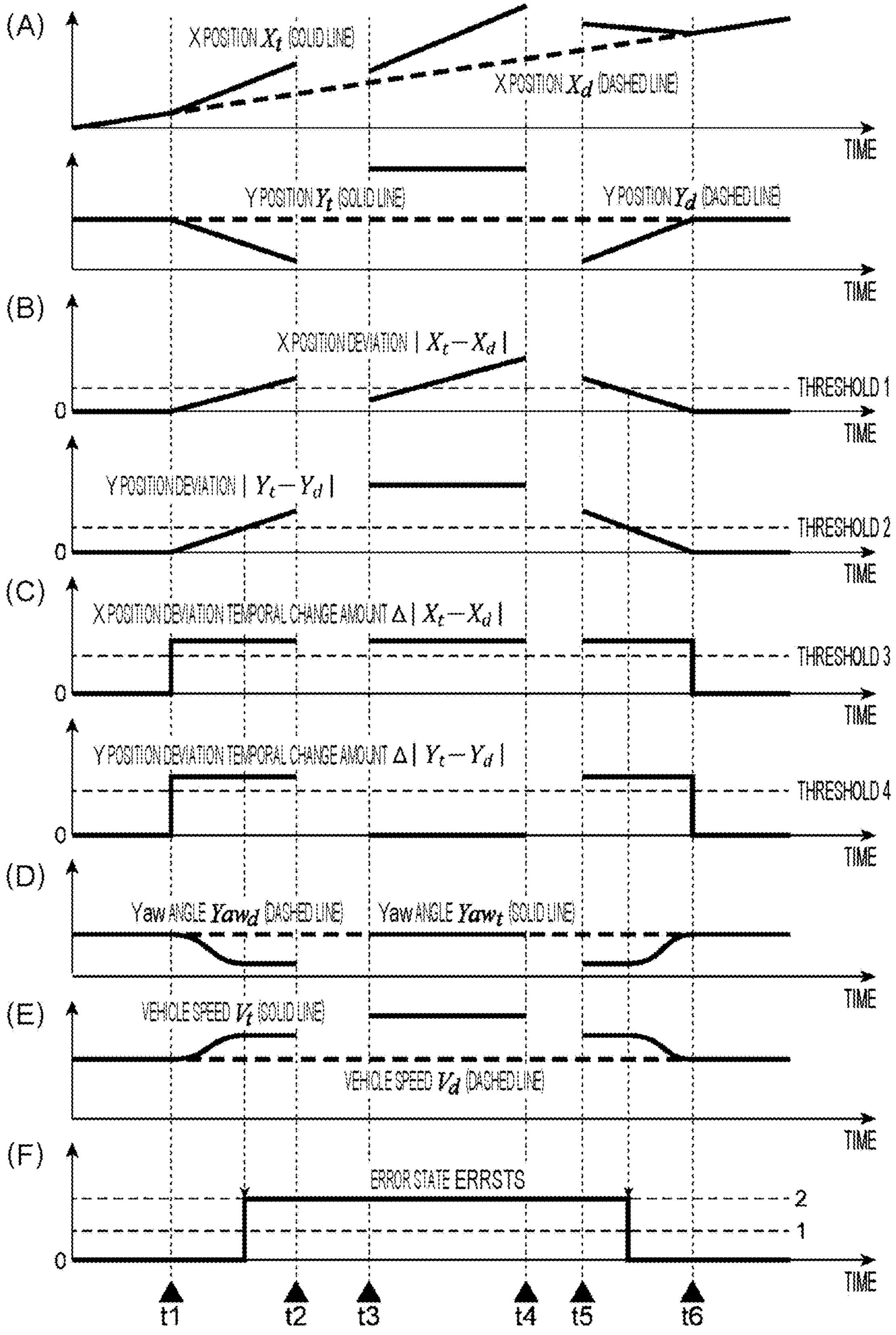
FIG. 14 is a time chart indicating own vehicle position information in a scene in which the own vehicle 100 that performs radio position estimation by triangulation on the basis of the orientation information of the radio transmitter 6 acquired by the radio receiver 5 according to an embodiment of the present invention enters a shadow of a shielding object.

Next, an example of processing from the radio position estimation S401 to the position information selection S404 in the scene of FIG. 13 will be described with reference to FIG. 14.

Before time t1, the radio receivers 5*a* and 5*b* not yet enter the shadow 1503, and thus, the position deviations |Xt−Xd| and |Yt−Yd| are equal to or less than the predetermined threshold, the error state ERRSTS becomes 0, and the own vehicle position of the own vehicle 100 is calculated by the radio position estimation.

Between time t1 and time t2, the radio receiver 5*a* enters the shadow 1503, so that the position deviations |Xt−Xd| and |Yt−Yd| increase as the own vehicle 100 moves to a darker side of the shadow 1503, and at the timing when the position deviation |Yt−Yd| exceeds the predetermined threshold 2, the X position deviation temporal change amount Δ|Xt−Xd| exceeds the predetermined threshold 3, and/or the Y position deviation temporal change amount Δ|Yt−Yd| exceeds the predetermined threshold 4, so that the error state ERRSTS becomes 2, and the own vehicle position of the own vehicle 100 is calculated by the own vehicle position estimation.

Between time t2 and time t3, the radio receiver 5*a* has lost the radio transmitter 6, and thus, the error state ERRSTS becomes 2, and the own vehicle position of the own vehicle 100 is calculated by the own vehicle position estimation. While the radio receiver 5*a* is in a recognition failure, the own vehicle position of the own vehicle 100 may be calculated on the basis of the distance information and the orientation information of the radio transmitter 6 acquired by the other radio receiver 5*b*.

Between time t3 and time t4, the radio receiver 5*a* detects the radio transmitter 6, and thus, the X position deviation |Xt−Xd| increases as the radio receivers 5*a* and 5*b* move in the shadow 1503, the Y position deviation |Yt−Yd| remains at a constant value, the Y position deviation |Yt−Yd| exceeds the predetermined threshold 2, and the X position deviation temporal change amount Δ|Xt−Xd| exceeds the predetermined threshold 3. Thus, the error state ERRSTS becomes 2, and the own vehicle position of the own vehicle 100 is calculated by the own vehicle position estimation.

Between time t4 and time t5, the radio receiver 5*b* has lost the radio transmitter 6, and thus, the error state ERRSTS becomes 2, and the own vehicle position of the own vehicle 100 is calculated by the own vehicle position estimation. While the radio receiver 5*b* is in a recognition failure, the own vehicle position of the own vehicle 100 may be calculated on the basis of the distance information and the orientation information of the radio transmitter 6 acquired by the other radio receiver 5*a*.

The radio receiver 5*b* detects the radio transmitter 6 after time t5, and thus, as the radio receivers 5*a* and 5*b* move in the direction of exiting the shadow 1503, the position deviations |Xt−Xd| and |Yt−Yd| decrease, the error state ERRSTS becomes 0 at the timing when the X position deviation |Xt−Xd| is equal to or less than the predetermined threshold 1, and the Y position deviation |Yt−Yd| is equal to or less than the predetermined threshold 2, and the own vehicle position of the own vehicle 100 is calculated by the radio position estimation.

According to the above configuration, it is possible to detect the error of the radio receiver 5 by diagnosing the influence of the shielding object of the radio receiver 5 on the basis of the temporal change of the own vehicle position deviation between the first own vehicle position and the second own vehicle position and to reduce the influence of the detection error of the radio receiver 5 that receives the radio wave from the radio transmitter 6 installed at an arbitrary position outside the vehicle 100.

Operation and Effect of First Embodiment

As described above, the vehicle control ECU 9 as the vehicle control device according to the first embodiment includes the radio position estimation unit 301 that receives a radio wave from the radio transmitter 6 installed at an arbitrary position outside the vehicle and calculates relative positions of the vehicle and the radio transmitter 6, the own vehicle position estimation unit 302 that calculates the position of the vehicle on the basis of information acquired by the sensor mounted on the vehicle, and the vehicle sensor error determination unit 303 that determines that the received radio wave is affected by a shielding object on the basis of comparison between the first own vehicle position acquired by the radio position estimation unit 301 and the second own vehicle position acquired by the own vehicle position estimation unit 302.

In addition, the vehicle sensor error determination unit 303 determines that an error is included in the first own vehicle position or the second own vehicle position on the basis of a temporal change of a deviation between the first own vehicle position and the second own vehicle position.

Further, the vehicle sensor error determination unit 303 determines the position of the vehicle from the first own vehicle position and the second own vehicle position on the basis of the result of the determination of the error.

In addition, the radio position estimation unit 301 calculates the relative positions of the vehicle and the radio transmitter 6 from at least one of distance information or orientation information acquired by at least one radio receiver 5 mounted on the vehicle.

In other words, the vehicle sensor error determination unit 303 compares two types of vehicle positions calculated using the sensor mounted on the vehicle and the radio transmitter 6 and determines that the radio transmitter 6 is affected by the shielding object in a case where a temporal change of the vehicle position deviation is detected.

According to the first embodiment, when a failure such as a slip or a step with respect to a sensor mounted on a vehicle or a shielding object or radio wave interference with respect to the radio transmitter 6 occurs, by determining that a detection error has occurred and determining a sensor to be used, it is possible to enhance robustness against the failure in own vehicle position estimation using the radio transmitter 6. In addition, the above effect can be obtained by using a sensor provided as standard in the vehicle without incorporating an external recognition sensor such as a camera and a sonar in the configuration.

Second Embodiment

Figure 7:
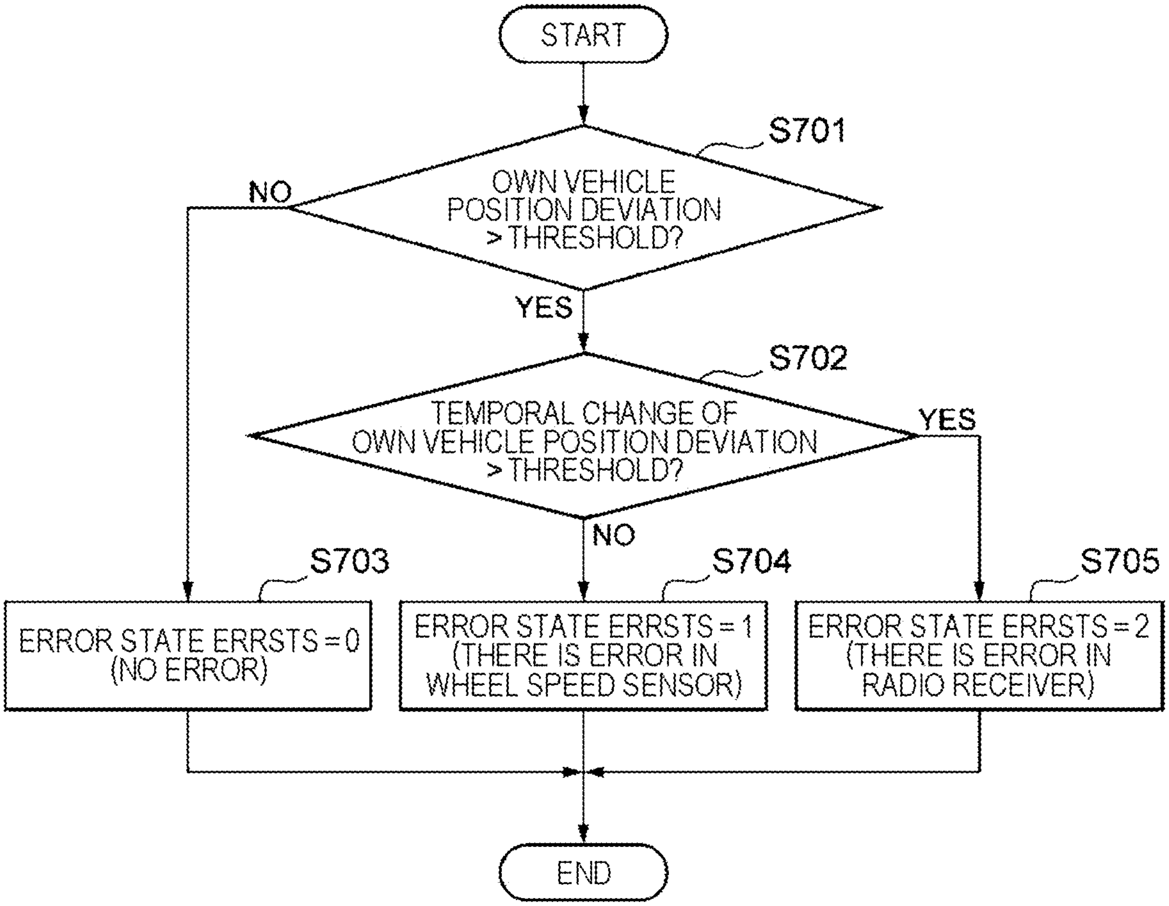
FIG. 7 is a flowchart indicating outline of error state determination based on a temporal change of an own vehicle position deviation according to the first embodiment of the present invention.

A second embodiment is a modification of processing outline of the error state determination S403 illustrated in FIG. 7 of the first embodiment. Hereinafter, the second embodiment of the present invention will be described in detail with reference to FIG. 15 and FIGS. 9 to 14.

First, details of the error state determination S403 different from that of the first embodiment will be described with reference to FIG. 15.

In S801, in order to determine whether an error is included in at least one of the wheel speed sensor 3 or the radio receiver 5, it is determined whether at least one of the deviation |Xt−Xd| or |Yt−Yd| of the respective element components of the first own vehicle position (Xt, Yt) and the second own vehicle position (Xd, Yd) exceeds a predetermined threshold. Here, if the deviation of the own vehicle position is equal to or less than the predetermined threshold, it is determined that the error is not included in the wheel speed sensor 3 and the radio receiver 5, and S804 is executed, and if the deviation of the own vehicle position exceeds the predetermined threshold, it is determined that the error is included in at least one of the wheel speed sensor 3 or the radio receiver 5, and S802 is executed. Further, in a case where the radio transmitter 6 is lost due to a failure and the first own vehicle position cannot be acquired, S806 is unconditionally executed. Note that in order to prevent erroneous determination, the determination in S801 may be made by satisfying the condition continuously for a predetermined determination period or a predetermined determination distance.

In S802, in order to determine whether an error is included in the radio receiver 5, it is determined whether a deviation |Yawt−Yawd| between the first yaw angle Yawt and the second yaw angle Yawd exceeds a predetermined threshold. Here, if the yaw angle deviation |Yawt−Yawd| is equal to or less than the predetermined threshold, it is determined that there is a possibility that the error is not included in the radio receiver 5, and S803 is executed. If the yaw angle deviation |Yawt−Yawd| exceeds the predetermined threshold, it is determined that there is influence due to the radio receiver 5 entering the shadow of the shielding object as viewed from the radio transmitter 6, and S806 is executed. In order to prevent erroneous determination, the determination in S802 may be made by continuously satisfying the condition for a predetermined determination period or a predetermined determination distance.

In S803, in order to further determine whether an error is included in the radio receiver 5, it is determined whether the deviation |Vt−Vd| between the first speed (vehicle speed) Vt and the second speed (vehicle speed) Vd exceeds a predetermined threshold. Here, if the vehicle speed deviation |Vt−Vd| is equal to or less than the predetermined threshold, it is determined that there is a possibility that the error is not included in the radio receiver 5, and S805 is executed. If the vehicle speed deviation |Vt−Vd| exceeds the predetermined threshold, it is determined that there is influence due to the radio receiver 5 entering the shadow of the shielding object as viewed from the radio transmitter 6, and S806 is executed. In to order prevent erroneous determination, the determination in S803 may be made by continuously satisfying the condition for a predetermined determination period or a predetermined determination distance.

In S804, the error state ERRSTS is set to 0 indicating that there is no error.

In S805, the error state ERRSTS is set to 1 indicating that there is an error in the wheel speed sensor 3 (in other words, the second own vehicle position).

In S806, the error state ERRSTS is set to 2 indicating that there is an error in the radio receiver 5 (in other words, the first own vehicle position).

Next, an example of processing from the radio position estimation S401 to the position information selection S404 in the scene of FIG. 9 will be described with reference to FIG. 10.

The radio receiver 5 not yet enters the shadow 1103 of the shielding object before time t1, and thus, the X position deviation |Xt−Xd| is equal to or less than the predetermined threshold, and the Y position deviation |Yt−Yd| is equal to or less than the predetermined threshold, the error state ERRSTS becomes 0, and the own vehicle position of the own vehicle 100 is calculated by the radio position estimation.

Between time t1 and time t2, the radio receiver 5 enters the shadow 1103 of the shielding object, so that the position deviations |Xt−Xd| and |Yt−Yd|, the yaw angle deviation |Yawt−Yawd| and the speed deviation |Vt−Vd| increase as the own vehicle 100 moves to the darker side of the shadow 1103, and the error state ERRSTS becomes 2 at the timing when the position deviation |Xt−Xd| and/or |Yt−Yd| exceeds the predetermined threshold, and the yaw angle deviation |Yawt−Yawd| and/or the speed deviation |Vt−Vd| exceeds the predetermined threshold, and the own vehicle position of the own vehicle 100 is calculated by the own vehicle position estimation.

The radio receiver 5 has lost the radio transmitter 6 between time t2 and time t3, and thus, the error state ERRSTS becomes 2, and the own vehicle position of the own vehicle 100 is calculated by the own vehicle position estimation.

After time t3, as the radio receiver 5 moves to the lighter side of the shadow 1103, the position deviations |Xt−Xd| and |Yt−Yd|, the yaw angle deviation |Yawt−Yawd|, and the speed deviation |Vt−Vd| decrease, and the error state ERRSTS becomes 0 at the timing when the position deviations |Xt−Xd| and |Yt−Yd| are each equal to or less than the predetermined threshold, and the own vehicle position of the own vehicle 100 is calculated by the radio position estimation.

Next, an example of processing from the radio position estimation S401 to the position information selection S404 in the scene of FIG. 11 will be described with reference to FIG. 12.

Before time t2, the wheel 2 rotates according to a traveling distance before getting on the muddy place 1303, so that the X position deviation |Xt−Xd| is equal to or less than the predetermined threshold, and the Y position deviation |Yt−Yd| is equal to or less than the predetermined threshold. Thus, the error state ERRSTS becomes 0, and the own vehicle position of the own vehicle 100 is calculated by the radio position estimation.

Between time t2 and time t3, the right front wheel 2FR slips due to the muddy place 1303, so that the position deviations |Xt−Xd| and |Yt−Yd| and the speed deviation |Vt−Vd| temporarily increase. At the timing when the position deviation |Xt−Xd| and/or |Yt−Yd| exceeds the predetermined threshold, the yaw angle deviation |Yawt−Yawd| is equal to or less than the predetermined threshold, and the speed deviation |Vt−Vd| is equal to or less than the predetermined threshold. Thus, the error state ERRSTS becomes 1, and the own vehicle position of the own vehicle 100 is calculated by the radio position estimation.

After time t3, by resetting the second own vehicle position to the first own vehicle position in S601 (FIG. 6) after a predetermined period has elapsed or the vehicle has traveled by a predetermined distance since the error state ERRSTS had become 1, the influence of slip is reduced. Note that when the second own vehicle position is corrected, the change amount of each element component may be limited to prevent the own vehicle 100 from performing sudden behavior.

Next, an example of processing from the radio position estimation S401 to the position information selection S404 in the scene of FIG. 13 will be described with reference to FIG. 14.

Before time t1, the radio receivers 5*a* and 5*b* not yet enter the shadow 1503, and thus, the position deviations |Xt−Xd| and |Yt−Yd| are equal to or less than the predetermined threshold, the error state ERRSTS becomes 0, and the own vehicle position of the own vehicle 100 is calculated by the radio position estimation.

Between time t1 and time t2, the radio receiver 5*a* enters the shadow 1503, so that the position deviations |Xt−Xd| and |Yt−Yd| increase as the own vehicle 100 moves to the dark side of the shadow 1503, and at the timing when the position deviation |Yt−Yd| exceeds the predetermined threshold 2, the yaw angle deviation |Yawt−Yawd| exceeds the predetermined threshold, and/or the speed deviation |Vt−Vd| exceeds the predetermined threshold, so that the error state ERRSTS becomes 2, and the own vehicle position of the own vehicle 100 is calculated by the own vehicle position estimation.

Between time t2 and time t3, the radio receiver 5*a* has lost the radio transmitter 6, and thus, the error state ERRSTS becomes 2, and the own vehicle position of the own vehicle 100 is calculated by the own vehicle position estimation. While the radio receiver 5*a* is in a recognition failure, the own vehicle position of the own vehicle 100 may be calculated on the basis of the distance information and the orientation information of the radio transmitter 6 acquired by the other radio receiver 5*b*.

Between time t3 and time t4, the radio receiver 5*a* detects the radio transmitter 6, and thus, as the radio receivers 5*a* and 5*b* move in the shadow 1503, the X position deviation |Xt−Xd| increases, the Y position deviation |Yt−Yd| remains at a constant value, and the vehicle speed deviation |Vt−Vd| exceeds a predetermined threshold. Thus, the error state ERRSTS becomes 2, and the own vehicle position of the own vehicle 100 is calculated by the own vehicle position estimation.

Between time t4 and time t5, the radio receiver 5*b* has lost the radio transmitter 6, and thus, the error state ERRSTS becomes 2, and the own vehicle position of the own vehicle 100 is calculated by the own vehicle position estimation. While the radio receiver 5*b* is in a recognition failure, the own vehicle position of the own vehicle 100 may be calculated on the basis of the distance information and the orientation information of the radio transmitter 6 acquired by the other radio receiver 5*a*.

The radio receiver 5*b* detects the radio transmitter 6 after time t5, and thus, as the radio receivers 5*a* and 5*b* move in the direction of exiting the shadow 1503, the position deviations |Xt−Xd| and |Yt−Yd| decrease, the error state ERRSTS becomes 0 at the timing when the X position deviation |Xt−Xd| is equal to or less than the predetermined threshold 1, and the Y position deviation |Yt−Yd| is equal to or less than the predetermined threshold 2, and the own vehicle position of the own vehicle 100 is calculated by the radio position estimation.

According to the above configuration, it is possible to detect the error of the radio receiver 5 by diagnosing the influence of the shielding object of the radio receiver 5 on the basis of the behavior change of the apparent position of the radio transmitter 6 by the radio position estimation and to reduce the influence of the detection error of the radio receiver 5 that receives the radio wave from the radio transmitter 6 installed at an arbitrary position outside the vehicle 100.

Operation and Effect of Second Embodiment

As described above, in the vehicle control ECU 9 as the vehicle control device according to the second embodiment, the vehicle sensor error determination unit 303 further determines that the received radio wave is affected by a shielding object in a case where a change in behavior of the first own vehicle position generated by shielding of the received radio wave is detected.

The change in the behavior includes at least one of behavior of losing the first own vehicle position (radio transmitter 6), behavior in which a traveling direction (first yaw angle Yawt) of the vehicle based on the first own vehicle position is different, by greater than a predetermined threshold, from a traveling direction (second yaw angle Yawd) of the vehicle based on the information acquired by the sensor (based on the second own vehicle position), and behavior in which vehicle speed (first speed Vt) of the vehicle based on the first own vehicle position is different, by greater than a predetermined threshold, from vehicle speed (second speed Vd) of the vehicle based on the information acquired by the sensor (based on the second own vehicle position).

In other words, the vehicle sensor error determination unit 303 compares two types of vehicle positions calculated using the sensor mounted on the vehicle and the radio transmitter 6 and determines that the radio transmitter 6 is affected by the shielding object when a behavior change of the vehicle position (first own vehicle position) based on the radio transmitter 6 is detected.

According to the second embodiment, when a failure such as a slip or a step with respect to a sensor mounted on a vehicle or a shielding object or radio wave interference with respect to the radio transmitter 6 occurs, by determining that a detection error has occurred and determining a sensor to be used, it is possible to enhance robustness against the failure in the own vehicle position estimation using the radio transmitter 6. In addition, the above effect can be obtained by using a sensor provided as standard in the vehicle without incorporating an external recognition sensor such as a camera and a sonar in the configuration.

Third Embodiment

Figure 15:
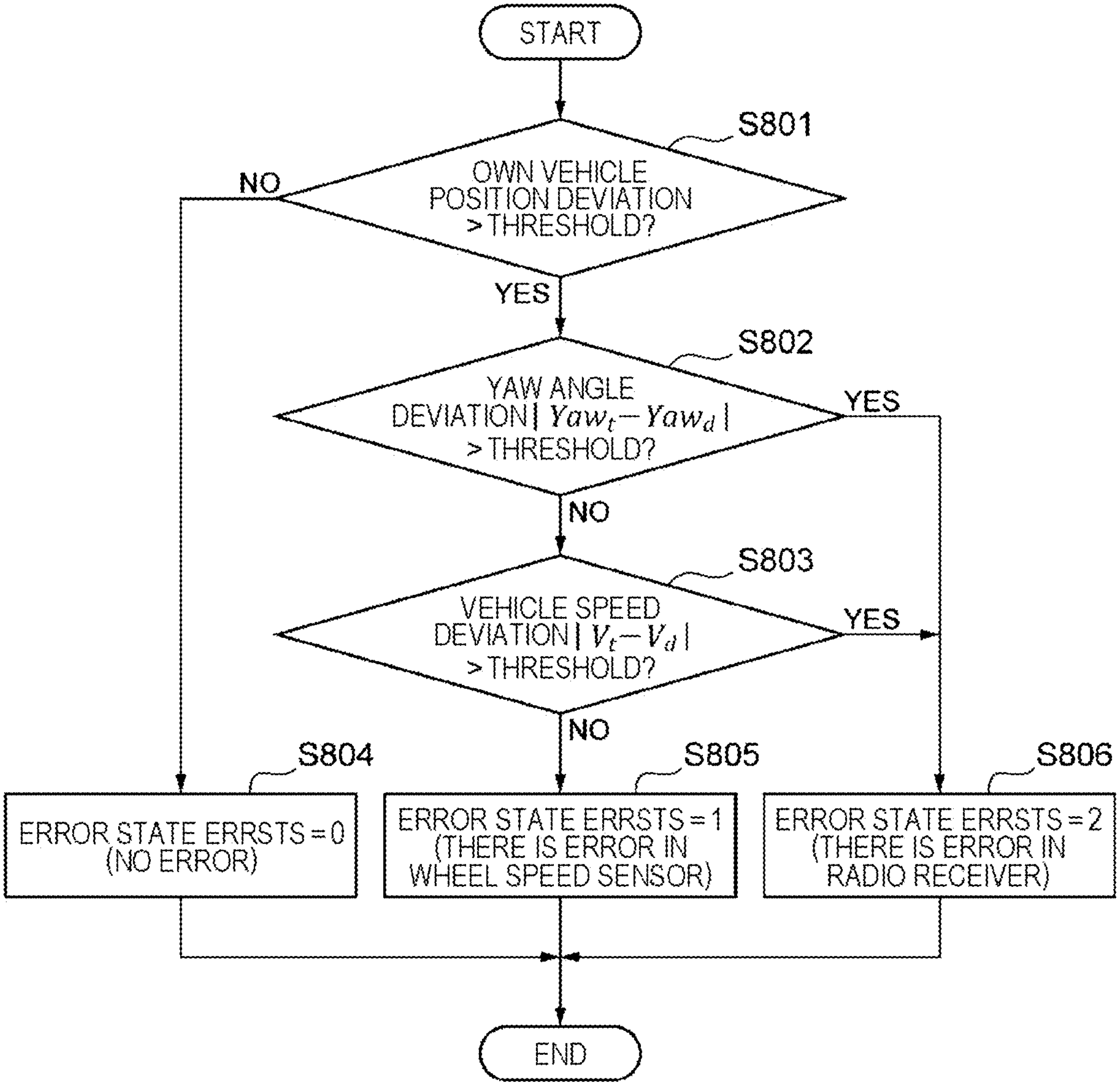
FIG. 15 is a flowchart indicating outline of error state determination based on a behavior change of an apparent position by radio position estimation according to a second embodiment of the present invention.
Figure 16:
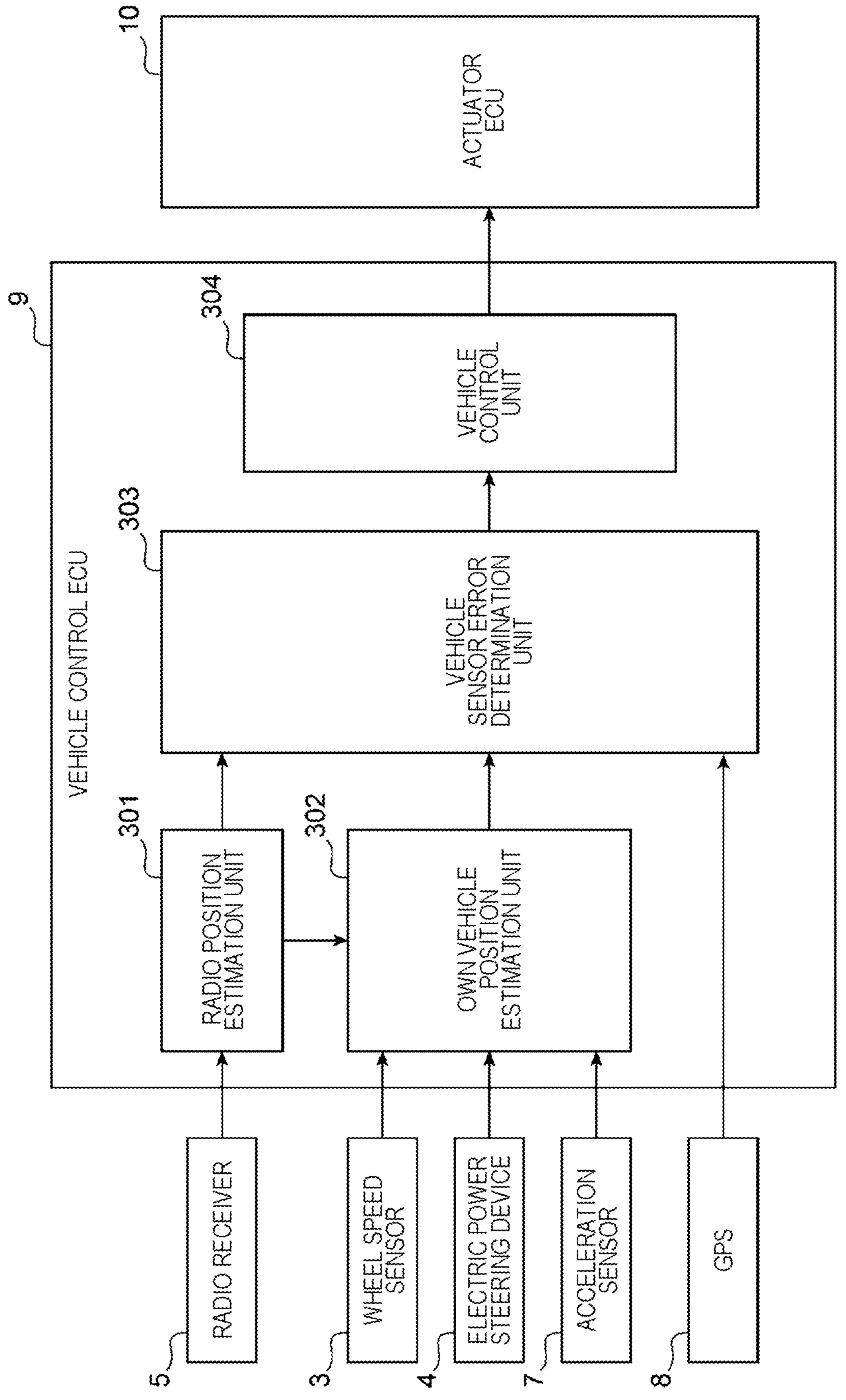
FIG. 16 is a functional block diagram of inside of the vehicle control ECU 9 according to a third embodiment of the present invention.

A third embodiment is a modification of part of the processing outline of the error state determination S403 illustrated in FIG. 15 in the second embodiment. It is needless to say that part of the processing outline of the error state determination S403 illustrated in FIG. 7 in the first embodiment may be modified. Hereinafter, the third embodiment of the present invention will be described in detail with reference to FIGS. 16 and 17. In the third embodiment, as illustrated in FIG. 16, a signal is input from the GPS 8 to the vehicle sensor error determination unit 303.

Figure 17:
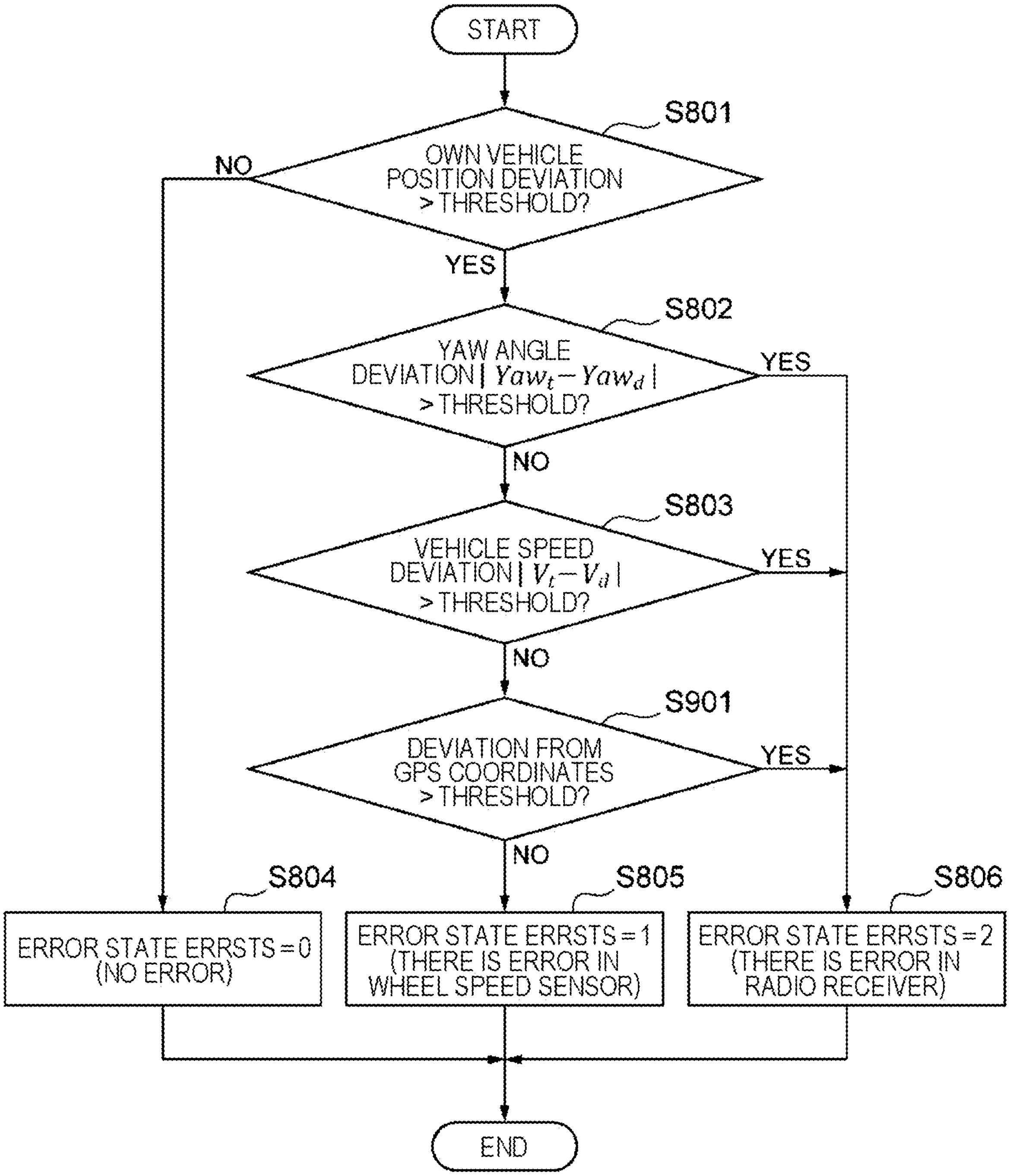
FIG. 17 is a flowchart indicating outline of error state determination to which accuracy determination of radio position estimation based on GPS coordinates is added according to the third embodiment of the present invention.
Figure 18:
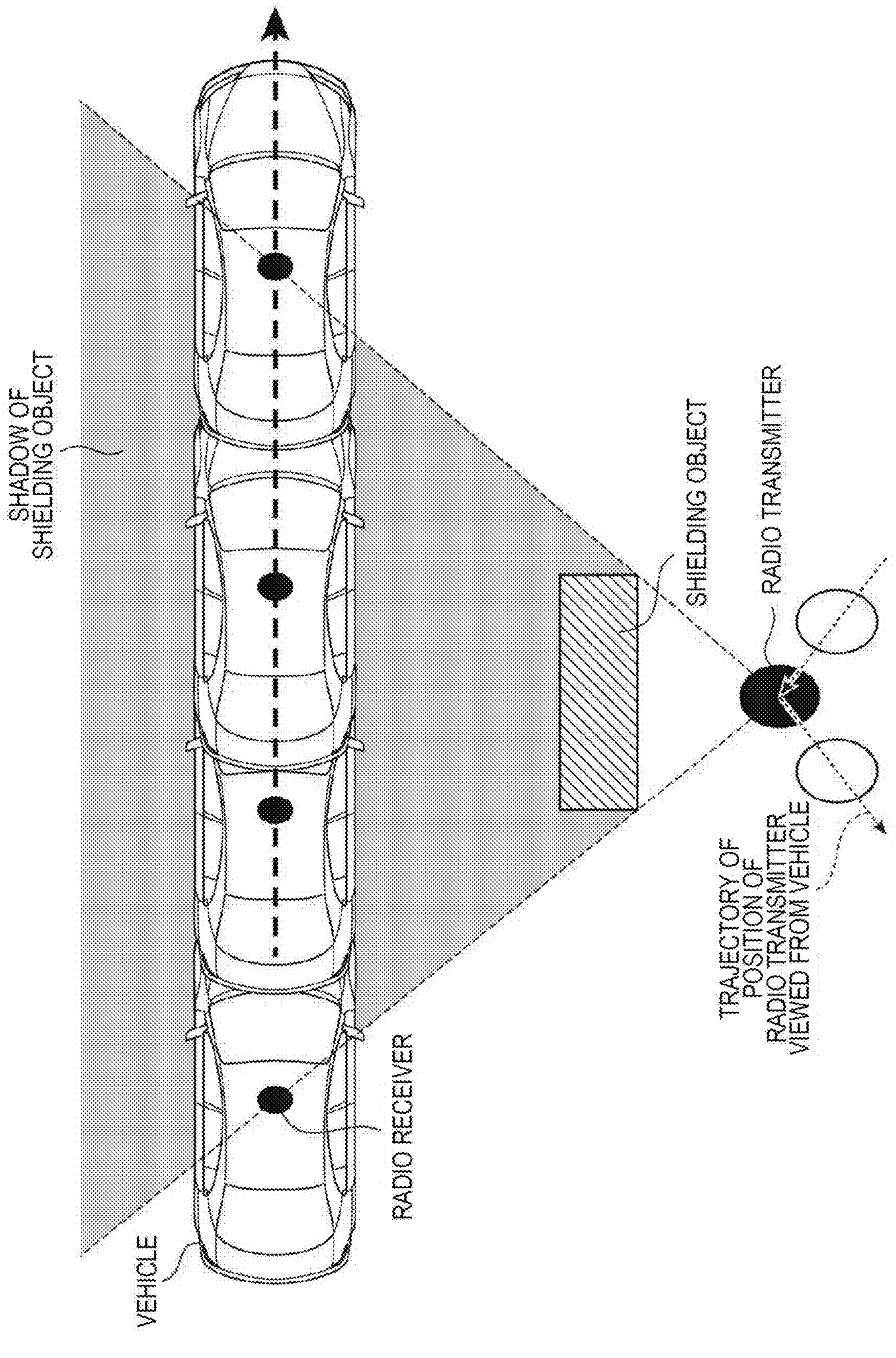
FIG. 18 is a bird's eye view illustrating that an apparent position of the radio transmitter moves as the radio receiver moves in the shadow of the shielding object.

First, processing in S901 of the error state determination S403 different from that in the second embodiment will be described with reference to FIG. 17.

In S901, in order to further determine whether an error is included in the radio receiver 5, it is determined whether a deviation between the first own vehicle position and a GPS own vehicle position (hereinafter, also referred to as GPS coordinates) exceeds a predetermined threshold. The GPS coordinates are absolute coordinates of the vehicle acquired from an artificial satellite, and refer to an own vehicle position of the own vehicle 100 calculated on the basis of a change amount of the own vehicle position of the own vehicle 100 acquired from the GPS 8 while setting a first own vehicle position acquired first as an initial position.

Here, if the deviation between the first own vehicle position and the GPS coordinates is equal to or less than a predetermined threshold, it is determined that the error is not included in the radio receiver 5, and S805 is executed. If the deviation between the first own vehicle position and the GPS coordinates exceeds the predetermined threshold, it is determined that there is influence due to the radio receiver 5 entering the shadow of the shielding object as viewed from the radio transmitter 6, and S806 is executed. In order to prevent erroneous determination, the determination in S901 may be made by continuously satisfying the condition for predetermined determination period or a predetermined determination distance.

According to the above configuration, it is possible to accurately detect the error of the radio receiver 5 by further diagnosing the influence of the shielding object of the radio receiver 5 on the basis of the own vehicle position (GPS coordinates) acquired from the GPS 8 and to reduce the influence of the detection error of the radio receiver 5 that receives the radio wave from the radio transmitter 6 installed at an arbitrary position outside the vehicle 100.

Operation and Effect of Third Embodiment

As described above, in the vehicle control ECU 9 as the vehicle control device according to the third embodiment, in a case where the deviation between the absolute coordinates (GPS coordinates) of the vehicle acquired from the artificial satellite and the first own vehicle position is greater than a predetermined threshold, the vehicle sensor error determination unit 303 determines that the received radio wave is affected by the shielding object.

According to the third embodiment, similarly to the first and second embodiments described above, when a failure such as a slip or a step with respect to a sensor mounted on a vehicle or a shielding object or radio wave interference with respect to the radio transmitter 6 occurs, by determining that a detection error has occurred and determining a sensor to be used, it is possible to enhance robustness against the failure in own vehicle position estimation using the radio transmitter 6. In addition, the above effect can be obtained by using a sensor provided as standard in the vehicle without incorporating an external recognition sensor such as a camera and a sonar in the configuration.

The present invention is not limited to the above-described embodiments and includes various modifications. For example, the above-described embodiments have been described in detail for easy understanding of the present invention, and the present invention is not necessarily limited to those having all the described configurations.

In addition, part or all of each of the above-described components, functions, processing units, processing means, and the like, may be implemented by hardware, for example, by designing with an integrated circuit or may be implemented by software, by a processor interpreting and executing a program for implementing each function.

Information such as a program, a table, and a file for implementing each function can be stored in a storage device such as a memory, a hard disk, and a solid state drive (SSD), or a recording medium such as an IC card, an SD card, and a DVD.

In addition, control lines and information lines indicate what is considered to be necessary for the description, and not all the control lines and information lines necessary for implementation are necessarily indicated. In practice, it may be considered that almost all the components are connected to each other.

REFERENCE SIGNS LIST

100 vehicle equipped with vehicle control device
2 wheel
3 wheel speed sensor
4 electric power steering device
5 radio receiver
6 radio transmitter
7 acceleration sensor
8 GPS
9 vehicle control ECU (vehicle control device)
10 actuator ECU
9*a* I/O LSI
9*b* CPU
301 radio position estimation unit
302 own vehicle position estimation unit
303 vehicle sensor error determination unit
304 vehicle control unit

The invention claimed is:

1. A vehicle control device comprising:
a processor configured to:
receive a radio wave from a radio transmitter installed at an arbitrary position outside a vehicle and calculates relative positions of the vehicle and the radio transmitter;
calculate a position of the vehicle on a basis of information acquired by a sensor mounted on the vehicle;
determine that the received radio wave is affected by a shielding object on a basis of a temporal change of a deviation between a first own vehicle position and a second own vehicle position meets a predetermined threshold condition; and
in response to determining that the sensor is affected by at least one of a step or a slip, update an initial position of the second own vehicle position by resetting the second own vehicle position to the first own vehicle position, wherein the resetting occurs after a predetermined period or after the vehicle has traveled by a predetermined distance.

2. The vehicle control device of claim 1, wherein the processor is further configured to determine that the received radio wave is affected by a shielding object in a case where a change in behavior of the first own vehicle position caused by shielding of the received radio wave is detected.

3. The vehicle control device of claim 2, wherein the change in the behavior includes at least one of:
behavior of losing the first own vehicle position,
behavior in which a traveling direction of the vehicle based on the first own vehicle position is different, by greater than a predetermined yaw-difference threshold, from a traveling direction of the vehicle based on the information acquired by the sensor; or
behavior in which vehicle speed of the vehicle based on the first own vehicle position is different, by a predetermined speed-difference threshold or greater, from vehicle speed of the vehicle based on the information acquired by the sensor.

4. The vehicle control device of claim 1, wherein the processor is further configured to determine that an error is included in the second own vehicle position in a case where the temporal change of the deviation is equal to or less than the predetermined threshold.

5. The vehicle control device of claim 1, wherein the processor is further configured to determine that an error is included in the first own vehicle position in a case where the temporal change of the deviation is greater than the predetermined threshold.

6. The vehicle control device of claim 1, wherein the processor is further configured to determine that the sensor is affected by at least one of a step or a slip in a case where the temporal change of the deviation is equal to or less than the predetermined threshold.

7. The vehicle control device of claim 1, wherein the processor is further configured to determine that the received radio wave is affected by a shielding object in a case where the temporal change of the deviation is greater than the predetermined threshold.

8. The vehicle control device of claim 1, wherein the processor is further configured to determine that the received radio wave is affected by a shielding object in a case where a deviation between absolute coordinates of the vehicle acquired from an artificial satellite and the first own vehicle position is greater than the predetermined threshold.

9. The vehicle control device of claim 1, wherein the processor is further configured to determine a position of the vehicle from the first own vehicle position and the second own vehicle position on a basis of a result of the determination of an error.

10. The vehicle control device of claim 1, wherein the processor is further configured to calculate the relative positions of the vehicle and the radio transmitter from at least one of distance information or orientation information acquired by at least one radio receiver mounted on the vehicle.

* * * * *